United States Patent
Ducrou et al.

(10) Patent No.: US 10,482,421 B1
(45) Date of Patent: Nov. 19, 2019

(54) SYSTEM FOR EXPEDITING DELIVERY OF ITEMS

(71) Applicant: AMAZON TECHNOLOGIES, INC., Seattle, WA (US)

(72) Inventors: Jon Robert Ducrou, Seattle, WA (US); Mark Steven Mastandrea, Santa Cruz, CA (US); Douglas James Herrington, Seattle, WA (US); Dennis Antonio Jumaquio, Seattle, WA (US); Hannah Elizabeth McClellan, Seattle, WA (US); Sandeep Rao, Seattle, WA (US); Harshal Dilip Wanjari, Issaquah, WA (US); Prashant Hegde, Seattle, WA (US); Paul Warren Smart, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 686 days.

(21) Appl. No.: 14/575,012

(22) Filed: Dec. 18, 2014

(51) Int. Cl.
| | |
|---|---|
| *G06Q 10/08* | (2012.01) |
| *G06K 9/00* | (2006.01) |
| *H04N 7/18* | (2006.01) |
| *G06F 16/29* | (2019.01) |

(52) U.S. Cl.
CPC ......... *G06Q 10/0836* (2013.01); *G06F 16/29* (2019.01); *G06K 9/00288* (2013.01); *G06K 9/00671* (2013.01); *G06K 9/00785* (2013.01); *H04N 7/181* (2013.01); *G06K 2209/15* (2013.01)

(58) Field of Classification Search
USPC ........................................................ 705/339
See application file for complete search history.

(56) References Cited

U.S. PATENT DOCUMENTS

| | | | |
|---|---|---|---|
| 6,993,490 B2 | 1/2006 | Chen et al. | |
| 7,291,497 B2 | 11/2007 | Holmes et al. | |
| 7,502,747 B1 | 3/2009 | Pardo et al. | |
| 7,974,873 B2 | 7/2011 | Simmons et al. | |
| 8,101,402 B2 | 1/2012 | Holmes | |
| 2003/0098802 A1* | 5/2003 | Jones ..................... | G08G 1/123 340/994 |
| 2004/0073449 A1 | 4/2004 | Yang | |

(Continued)

OTHER PUBLICATIONS

Perez, Sarah, "Backed by $9.5 Million, Curbside Launches A Mobile Shopping App For SameDay Pickup, Not Delivery"; TechCrunch, Oct. 6, 2014 (Year: 2014).*

(Continued)

*Primary Examiner* — Kevin H Flynn
*Assistant Examiner* — Emmett K. Walsh
(74) *Attorney, Agent, or Firm* — Lindauer Law, PLLC

(57) ABSTRACT

A user may order items that may be made available at a facility such as a pickup facility. Described are techniques for preparing and expediting an order for pick up by the user. In one implementation, geolocation data acquired from a user device may be used to determine when the user has entered a geofence associated with the facility. Based on this geolocation data and sensor data from sensors at the facility, a system may automatically identify the user. Once identified, the items in the order may be delivered to the user in a parking area of the pickup facility, who may then depart the pickup facility.

20 Claims, 14 Drawing Sheets

(56) References Cited

U.S. PATENT DOCUMENTS

| | | |
|---|---|---|
| 2004/0177008 A1 | 9/2004 | Yang |
| 2005/0027580 A1 | 2/2005 | Crici et al. |
| 2005/0234741 A1 | 10/2005 | Rana et al. |
| 2008/0029595 A1* | 2/2008 | Waller ............... G06Q 10/087 235/383 |
| 2008/0082424 A1* | 4/2008 | Walton ............... G06Q 10/047 705/26.1 |
| 2010/0106517 A1 | 4/2010 | Kociubinski et al. |
| 2011/0139545 A1 | 6/2011 | Bridgman et al. |
| 2012/0053963 A1* | 3/2012 | Seymour ........... G06Q 10/1095 705/3 |
| 2012/0072311 A1 | 3/2012 | Khan |
| 2014/0074743 A1* | 3/2014 | Rademaker ........... G06Q 50/28 705/334 |
| 2014/0180576 A1 | 6/2014 | Lamarca et al. |
| 2014/0279269 A1* | 9/2014 | Brantley ............ G06Q 30/0635 705/26.81 |
| 2014/0317005 A1* | 10/2014 | Balwani ............ G06Q 10/0832 705/317 |
| 2015/0339923 A1* | 11/2015 | Konig .................... G08G 1/202 701/522 |

OTHER PUBLICATIONS

Allen, Akiba Kanelle., "Non-Final Office Action dated Apr. 17, 2018", U.S. Appl. No. 14/575,189, The United States Patent and Trademark Office, filed Apr. 17, 2018.

Allen, Akiba Kanelle, "Final Office Action dated Sep. 14, 2018", U.S. Appl. No. 14/575,189, The United States Patent and Trademark Office, filed Sep. 14, 2018.

Allen, Akiba Kanelle, "Final Office Action dated Sep. 20, 2019", U.S. Appl. No. 14/575,189, The United States Patent and Trademark Office, dated Sep. 20, 2019.

* cited by examiner

802 — DETERMINE GEOFENCE DATA COMPRISING ONE OR MORE GEOGRAPHIC BOUNDARIES WITH RESPECT TO A FACILITY

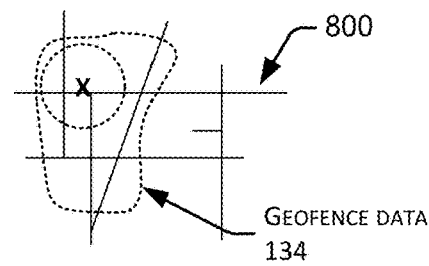

800

GEOFENCE DATA 134

804 — PROVIDE THE GEOFENCE DATA TO ONE OR MORE DEVICES

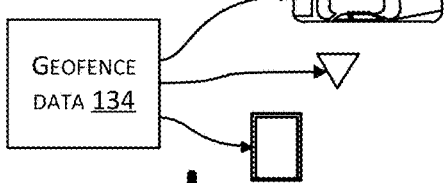

GEOFENCE DATA 134

806 — ACCESS GEOLOCATION DATA FROM THE ONE OR MORE DEVICES

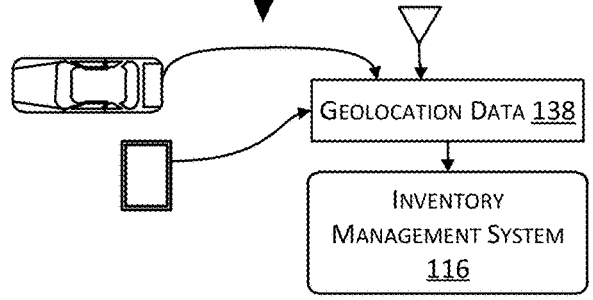

GEOLOCATION DATA 138

INVENTORY MANAGEMENT SYSTEM 116

808 — GENERATE ESTIMATED TIME OF ARRIVAL DATA BASED ON THE GEOLOCATION DATA

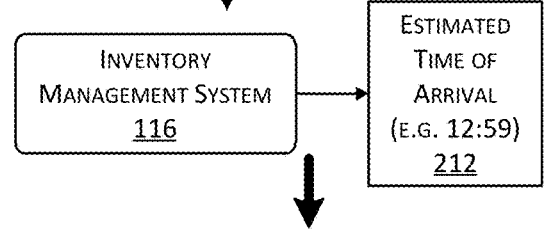

INVENTORY MANAGEMENT SYSTEM 116

ESTIMATED TIME OF ARRIVAL (E.G. 12:59) 212

810 — DETERMINE A TIME OF ENTRY OF ONE OR MORE OF A VEHICLE, USER, OR A USER DEVICE

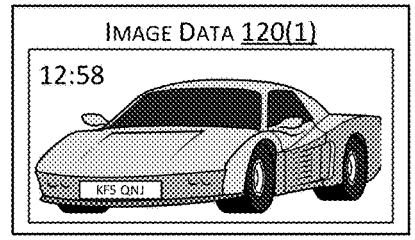

IMAGE DATA 120(1)
12:58

812 — BASED ON THE ESTIMATED TIME OF ARRIVAL AND THE TIME OF ENTRY, DETERMINE A USER IDENTIFIER OF THE USER AT THE FACILITY

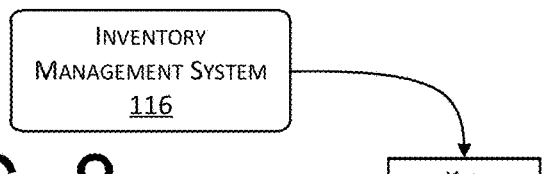

INVENTORY MANAGEMENT SYSTEM 116

KAY

FIG. 8

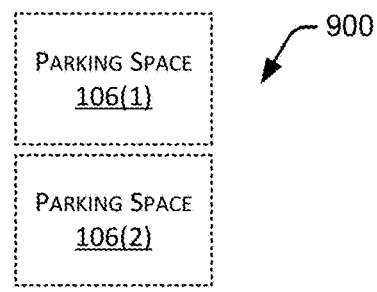
902 — DETERMINE A PARKING SPACE ASSOCIATED WITH A USER AND A STAGED ORDER
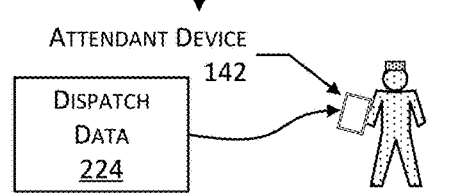
904 — GENERATE DISPATCH DATA
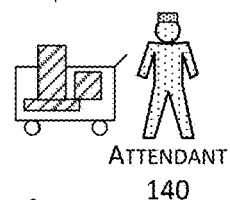
906 — ATTENDANT RETRIEVES THE STAGED ORDER AND CONVEYS TO THE PARKING SPACE
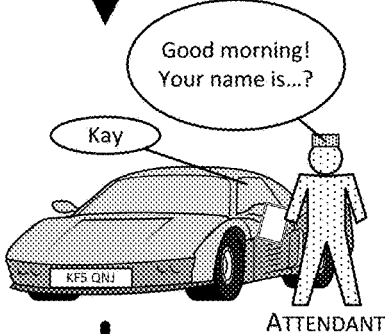
908 — CONFIRM IDENTITY OF A USER IN THE PARKING SPACE
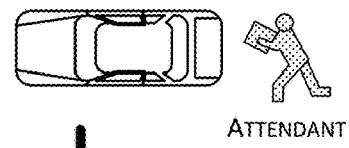
910 — PHYSICALLY TRANSFER ONE OR MORE ITEMS TO THE USER
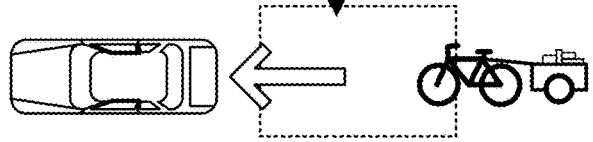
912 — USER DEPARTS, NEXT USER ARRIVES
FIG. 9

SYSTEM FOR EXPEDITING DELIVERY OF ITEMS

BACKGROUND

Merchants may have a variety of items that are available for purchase. Users have become accustomed to the convenience of placing orders for these items using an e-commerce website, telephone, video chat, and so forth. Traditional methods of delivering the ordered items may not provide the value, convenience, or experience that users desire.

BRIEF DESCRIPTION OF THE DRAWINGS

FIG. 8 illustrates a scenario in which a user identity is determined based on an estimated time of arrival and an actual time of arrival at the pickup facility.

FIG. 9 illustrates a scenario in which at least a portion of staged items of an order are transferred to the user at the pickup facility.

Figure 1:
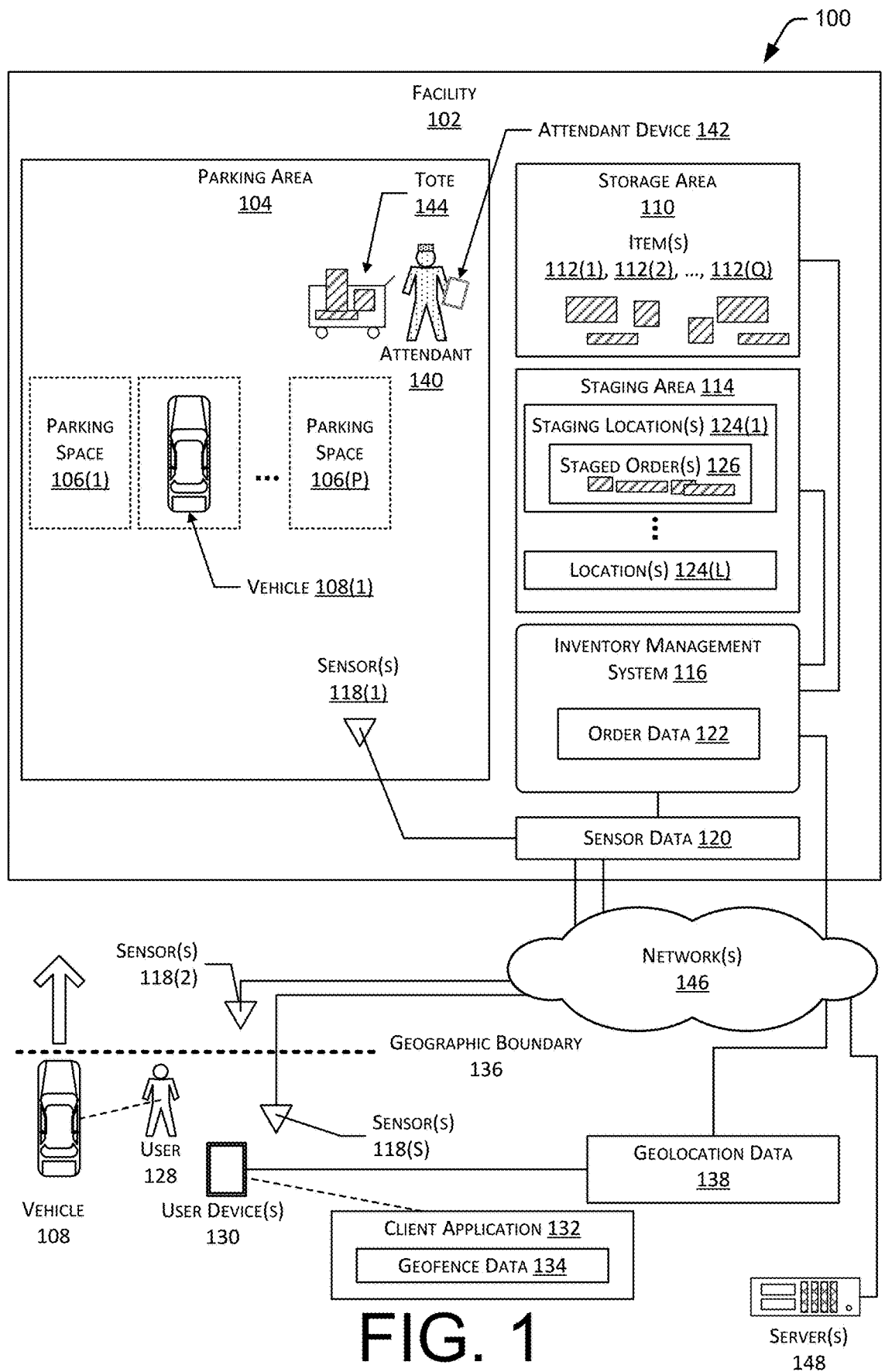
FIG. 1 illustrates a system for expediting delivery of items ordered by a user at a pickup facility.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Every day, users consume a variety of items ranging from groceries to household goods. Traditionally, physical custody of the items may be transferred to a user at a retail storefront or via delivery using a fleet of delivery vehicles. For example, the user may place an order through an e-commerce website for one or more items. The user may go to a retail storefront to pick up the order or may wait for delivery of the order to their home or business. In the scenario where the user picks up their order from the retail storefront, the interaction requires parking a vehicle, walking into the store, providing identification, providing payment information, taking custody of the goods, carrying the goods back to the vehicle, and departing. This interaction may take some time, and thus may be inconvenient to the user who is in a hurry or has other appointments to keep. Delivery to a home or business frees the user from the inconvenience of visiting the retail storefront, but introduces other potential difficulties such as theft of packages left unattended at the home or business, damage to the items due to environmental factors such as extreme heat or cold, damage from transit, and cutoff times to order one or more items to ensure particular delivery times. For example, an item must be ordered before a cutoff time to ensure time for picking and loading the item onboard the delivery vehicle. Furthermore, it may not be possible to coordinate an exact delivery time of the ordered item, which potentially results in a user waiting for the delivery vehicle to arrive. While the retail storefront and the delivery methods offer some advantages, some users may find it advantageous to be able to utilize a pickup facility (facility) to accept physical custody of one or more items that have been ordered.

Described in this disclosure is a system to support operation of a facility such that delivery of items to a user is expedited. A user may place an order for one or more items using an e-commerce website, input is received by an application executing on a user device, telephone, video chat, and so forth. For example, the user may dictate a list of items or a particular recipe to be prepared to an application executing at least in part on the user device. Based on the user's shopping list, an order for the one or more items may be created. In one implementation, a user device may present the user with information indicative of a time when the order will be ready to be picked up or a set of available pickup timeslots. The user may then provide input selecting one of the available pickup timeslots.

The order may be processed and picked from inventory by staff (such as "pickers") at a facility. The items in the picked order may be gathered (at least partly) together to form a staged order that is available for pickup at the facility. For example, the order may be received and pick data may be generated for human or robotic pickers to pick particular items present on the order and place them in one or more totes or other containers or locations. In some implementations, at least a portion of the order may be picked at a fulfillment center or warehouse, and then transferred to the facility.

The staged order is then ready for pickup by the user at the agreed-upon time, such as at the selected pickup timeslot. In some implementations, different items in the staged order may be stowed at different locations within the staging area.

For example, some items may require refrigeration while other items may need to be kept in a freezer to prevent damage. The staging area may include an ambient temperature storage area, a refrigerated area, a freezer area, a heated area, and so forth. In other implementations, the items may be stowed within totes or other packing material configured to maintain a desired temperature range or other environmental limits. For example, the entire staging area may be refrigerated. Continuing the example, the items in the order requiring maintenance at below freezing temperatures may be stowed within insulated totes that remain within the refrigerated area.

One or more sensors provide geolocation data indicative of the user's approach to the facility. In one implementation, a client application executing on the user device, such as a smartphone or tablet, may provide geolocation data indicating the user device has passed a geographic boundary. In another implementation, a navigation system onboard a vehicle may provide information to a server associated with the facility. The information may include the geolocation and the intended destination of the vehicle as being the facility. In yet another implementation, other sensors such as cellular communication networks, wireless networks, license plate readers, toll road systems, and so forth, may provide information about the geolocation of the user or a vehicle or another device associated with the user.

The geographic boundary may be used to provide a geofence or set of coordinates or boundary with respect to a particular location, such as the facility. For example, the geographic boundary may designate a perimeter around the facility. The geographic boundary may be selected such that the travel time from the geographic boundary to the facility provides sufficient time for the staged order to be prepared for pickup.

Once the system determines that the user has passed the geographic boundary, the staged order may be prepared for delivery. For example, the various portions of the staged order that have been stowed in different locations such as the refrigerated area, ambient area, freezer area, and so forth, may be consolidated or otherwise prepared for delivery. In one implementation, the system may determine a predicted parking space where the user is likely to park their vehicle. An attendant with the tote comprising the consolidated staged order may then be dispatched to the predicted parking space or an area nearby to await the arrival of the user.

As the user enters a parking area of the facility, the user may park in whatever designated parking area is of their choosing. Sensors gather data that may be used to determine the presence of the vehicle such as a license plate number or other vehicle identification data.

In some situations, the system may not yet have information associating vehicle identification data with a particular user. Continuing the example, the situation may occur for a first time user, a user who has purchased a new car, a user who has recently had their license plates changed, and so forth. Based on the estimated time of arrival (ETA) and actual time of entry (TOE), the system may attempt to determine the identity of the user in the vehicle that entered the parking area. For example, based on one or more of the geolocation data received, the pickup timeslot scheduled, and the time of entry, the system may determine that the user "Kay" has entered the parking area.

Dispatch data is provided to an attendant by way of one or more attendant devices. Attendant devices may include tablets, wearable devices, display screens, and so forth. The dispatch data provides information such as an indicator of a parking space in which the user has parked their vehicle in the parking area and identification information about the user such as a name, picture, and so forth. For example, the attendant device may comprise a tablet used by the attendant. Upon determining that the user passed the geographic boundary and is inbound for a pickup, the dispatch data presented may indicate which locations the staged order is to be retrieved from. Responding to this, the attendant may gather together the items of the staged order and place them on the tote. The attendant may be waiting for the user at a predicted parking space or else arrive shortly thereafter at another parking space of the user's selection. The attendant may acquire validation data from the user to confirm identity. For example, the attendant may ask the user to state their name. If the name given corresponds to the name indicated by the dispatch data, the attendant may begin to load the items from the tote to the user's vehicle.

Once the loading is complete, the user may be on their way. Because the order was previously processed, the user may not need to provide any additional identification or payment information. In the situation where the vehicle identification data associated with the vehicle has not been previously associated with the particular user, the validation data provided by the attendant may be used to store a persistent association between the vehicle identification data and a user identifier of the particular user. During subsequent visits, this association between vehicle identification data and the user's identity may be used. Continuing the example, upon the second visit to the facility, the license plate number of the vehicle used by the user "Kay" may be read automatically by a license plate reader and may be used to identify the user that has entered the facility.

In some implementations, additional operations may be supported. For example, items that may be of interest to the user or to a group of users may be picked as part of a prospective order and may also be brought out to the user in the parking space. Before, during, or after the loading of the items as ordered by the user initially, the user may decide to purchase one or more of the items in the prospective order. These items may be transferred into the physical custody of the user, and the user account and inventory information may be adjusted accordingly. For example, the prospective order may include a favorite beverage of the user. The user, after being offered the favorite beverage by the attendant, may choose to partake in the favorite beverage. The inventory of the facility may be decremented, and the account of the user may be billed accordingly.

In some situations, the user may decide to add items or replace items while at the facility. For example, the user may add an item on impulse, may reject an item and want a replacement, an item may be missing from the order as delivered, and so forth. A second order may be generated, which may receive expedited processing. For example, the expedited processing may include a rush pick in which multiple pickers are dispatched to simultaneously pick those items and deliver them as quickly as possible to the parking space. Continuing the example, the user may decide that a particular piece of produce is not satisfactory and may request a replacement. A rush pick for that piece of produce and the quantity desired may be generated and processed at the facility. The replacement piece of produce may then be expeditiously delivered to the parking space.

By using the techniques and systems described, the user experience is seamless and expeditious. For example, the user may place an order for groceries the night before and select a pickup time on their way home from work the next day. The next day, the user need not take any action other than driving up to the facility. Continuing the example, during the user's commute home the user drives towards the facility. Responsive to the geolocation data, by the time the user arrives at the facility, their order is staged and waiting for them to pick up without delay. The user pulls into the facility, finds a parking space of their choice, and waits. Within a matter of minutes or less, an attendant arrives at the parking space with their order. During the user's first visit, the user, the user's face, or the user's vehicle may not be recognized. The attendant may confirm the identity of the user such as by asking the user to give their name. In other implementations where the user, the user's face, or the user's vehicle have been recognized previously, the attendant may greet the user by name and begin loading the order immediately. Once the items in the order have been loaded, the user may then proceed on their way without having to bother with entering payment information, order confirmation, and so forth, and the parking space is available for another user.

Illustrative System

FIG. 1 illustrates a system 100 for expediting delivery of items ordered by a user at a pickup facility. A pickup facility ("facility") 102 is depicted. The facility 102 may comprise a dedicated facility that is a stand-alone. The facility 102 may also comprise a portion of another facility such as a warehouse or fulfillment center. In some implementations, the facility 102 may be mobile. For example, the facility 102 may comprise one or more cargo containers or transportable elements.

The facility 102 may include a parking area 104 having one or more parking spaces 106(1), 106(2), . . . , 106(P). As used herein, letters enclosed by parenthesis such as "(P)" indicate an integer that may have a value greater than zero. The parking spaces 106 are sized to accept a vehicle 108. The vehicle 108 may comprise an automobile, a bicycle, autonomous craft, and so forth.

In some implementations, the facility 102 may be configured to process walk-up traffic, and instead of parking spaces 106, there may be a counter or pickup spaces suitable for a user. For example, the facility 102 may be located adjacent to a train station or other mass transit facility.

The facility 102 may include a storage area 110. The storage area 110 may be configured to hold one or more items 112(1), 112(2), . . . , 112(Q). The storage area 110 may be arranged in various physical configurations. In one implementation, the storage area 110 may include one or more aisles. The aisles may be configured with, or defined by, inventory locations on one or both sides of the aisle. The inventory locations may include one or more of shelves, racks, cases, cabinets, bins, floor locations, slat walls, pegboards, trays, dispensers, or other suitable storage mechanisms. The inventory locations may be affixed to the floor or another portion of the facility's 102 structure in the storage area 110. The inventory locations may also be movable in the storage area 110 such that the arrangements of aisles may be reconfigurable. In some implementations, the inventory locations in the storage area 110 may be configured to move independently of an outside operator. For example, the inventory locations may comprise a rack with a power source and a motor, operable by a computing device to allow the rack to move from one location within the storage area 110 of the facility 102 to another. Continuing the example, the inventory location may move from one aisle to another, from one location within an aisle to another, and so forth. In another example, the inventory locations may be configured to translate, rotate, or otherwise move relative to the storage area 110 of the facility 102.

The staging area 114 in the facility 102 is used to hold one or more items 112 that have been ordered after the items 112 have been picked by a picker. An inventory management system 116 directs operation within the facility 102. One or more sensors 118 provide sensor data 120 to the inventory management system 116. The sensors 118 may include, but are not limited to, cameras, weight sensors, and so forth. The sensors 118 are described in more detail below with regard to FIG. 3.

The inventory management system 116 may receive order data 122 from another system. For example, the order data 122 may be received from an e-commerce server. The inventory management system 116 may process the order data 122 and generate information such as pick data used to instruct pickers at the facility 102 of where and what items 112 to retrieve from the storage area 110. One or more pickers gather the items 112 indicated by the order data 122 and place those items 112 at one or more staging locations 124(1), 124(2), . . . , 124(L) within the staging area 114. A staged order 126 comprises the one or more items 112 associated with particular order data 122 that have been placed temporarily in one or more of the staging locations 124. Prior to delivery, the component portions of the staged order 126 may be consolidated.

The staging locations 124 in the staging area 114 may be configured to provide particular environmental conditions suitable to prevent or minimize damage to the one or more items 112. For example, the staging locations 124 may include rooms or enclosures kept at ambient temperature (such as 22° C.), refrigerated temperatures (such as between 2° and 8° C.), freezing temperatures (such as below minus 18° C.), heated temperatures (such as above 162° C.), and so forth. In some implementations, the pickers may place the items 112 into containers coded for use within a particular staging location 124. For example, items 112 retrieved from a freezer area in the storage area 110 may be placed into blue bags indicating that the items 112 are to be kept in the freezer staging location 124.

A user 128 may use a vehicle 108 to provide enhanced mobility, increased cargo capacity, and so forth. The user 128 may have one or more user devices 130. The user devices 130 may include, but are not limited to, smartphones, tablets, laptop computers, in-vehicle computer systems, desktop computers, portable product scanning devices, media devices, electronic (e-book) readers, personal fitness trackers, wearable computing devices, and so forth. The user device 130 may include a client application 132. The client application 132 may be configured to receive geofence data 134. The geofence data 134 provides data indicative of one or more geographic boundaries 136. The geographic boundaries 136 may specify particular coordinates, street addresses, street intersections, distances relative to a point, and so forth. The geographic boundary 136 may be selected or designated to provide a desired amount of time to the system 100 to prepare the staged order 126 for pick up at the facility 102. For example, where it is desired to allow staff of the facility 102 five minutes to prepare a staged order 126 for delivery prior to arrival of the user 128, a geographic boundary 136 may be set at a distance corresponding to a five minute travel time to the facility 102.

In some implementations, the geographic boundary 136 may vary by the time of day. For example, during peak commute hours when travel times may be slower, the geographic boundary 136 may be closer in terms of distance to the facility 102 than during off-peak hours when travel times are faster. In other implementations, the geographic boundary 136 may be varied based at least in part upon the congestion or usage of the facility 102. For example, during peak usage hours, the geographic boundary 136 may be extended to provide additional time for the staff of the facility 102 to prepare the staged order 126 for pick up. In some implementations, instead of or in addition to a geographic boundary 136, information indicative of an estimated time of arrival may also be used.

Geolocation data 138 may be provided to the inventory management system 116 from one or more of sensors 118, user devices 130, and so forth. In one example, the client application 132 may use the geofence data 134 to determine if the user device 130 has crossed the geographic boundary 136. Upon determining that the user device 130 has crossed the geographic boundary 136, the client application 132 may send geolocation data 138 indicative of this to the inventory management system 116.

Geolocation data 138 may be provided by other systems instead of or in addition to the user device 130. For example, the vehicular telematics systems may provide information such as a current geolocation of the vehicle 108, a destination currently in use by a navigation system, speed of the vehicle 108, and so forth. In another example, the geolocation data 138 may be obtained from other systems such as carrier or network operators. Continuing this example, a cellular communication system may provide geolocation data 138 of user devices 130 accessing communication resources such as cellular sites or wireless access points. In another example, the sensors 118 may comprise a traffic monitoring system used to manage flow of vehicles 108 in the city. The sensors 118 may include cameras, radio frequency identification (RFID) readers, and so forth. Given a known position of the sensor 118 and detection of vehicle identification data such as reading a license plate number or detecting an RFID tag, geographic location information about the vehicle 118 may be obtained.

The inventory management system 116, responsive to the geolocation data 138, is configured to notify the attendant 140 of the inbound user 128. Dispatch data may be provided to the attendant 140 by way of one or more attendant devices 142. For example, the attendant devices 142 may comprise tablets, wearable devices, display screens, and so forth. Responsive to the dispatch data, the attendant 140 gathers the staged order 126 and may place it in or on one or more totes 144. The tote 144 may comprise a bag, basket, a cart, and so forth. In some implementations where the staged order 126 comprises a single item 112 that is easily carried, the tote 144 may be omitted. Further, responsive to the dispatch data, the attendant 140 proceeds with the tote 144 to a parking space 106. The parking space 106 may be determined based on data from sensors 118 at the facility 102. For example, the sensors 118 may comprise cameras configured to read the license plate number of the vehicle 108 and determine a parking space 106 that the vehicle 108 has parked in. In other implementations, the parking space 106 may be determined in advance of the arrival of the vehicle 108 based on previous interactions involving one or more of the vehicle 108 or the user 128.

While the attendant 140 is described in this disclosure primarily as being a human, in some implementations, the attendant 140 may comprise a robot or other device. For example, the attendant 140 may comprise a tote 144 that is equipped for autonomous or semi-autonomous operation. In some implementations, a human operator may direct the robotic attendant 140 and may interact with the user 128, such as via a video chat facilitated by a camera and a display device onboard the robotic attendant 140.

Once the vehicle 108 is parked within the parking space 106, the attendant 140 may proceed to unload the one or more items 112 stowed in or on the tote 144. The one or more items 112 may comprise at least a portion of the items 112 included in the order data 122. For example, items 112 that are out of stock or that were refused by the user 128 may remain undelivered.

In some implementations, the attendant 140 may confirm or validate the identity of the user 128. For example, the attendant 140 may ask the user 128 for their name, ZIP Code of their billing address, telephone number, a secret code word, may compare the face of the user 128 with a previously stored image of the face of the user 128 such as from their last visit, and so forth. In other implementations, the validation may be performed automatically. For example, sensors 118 may acquire an image of the face of the user 128 while they are in the parking space 106. Using one or more facial recognition techniques, the face of the user 128 sitting in the vehicle 108 may be compared with a previously stored image of the user 128, such as acquired at a previous visit to the facility 102 or during a registration process to use the facility 102.

As described below in more detail, the inventory management system 116 may use this validation data in association with the vehicle identification data of the vehicle 108 and the particular user identity of the user 128. For example, where the user 128 arrived at the facility 102 with a vehicle 108 having a different license plate number relative to a previous visit, once the identity of the user 128 has been validated, the license plate number of the current vehicle 108 may be subsequently associated with the identity of the user 128. In some implementations, vehicle identification data for particular classes of vehicles may be disregarded. For example, license plate numbers of rental cars may be omitted from this association.

The devices and systems described in this disclosure may communicate with one another or with other devices or systems using one or more networks 146. The network 146 may include private networks, public networks such as the Internet, or a combination thereof. The network 146 may utilize wired technologies (e.g., wires, fiber optic cable, and so forth), wireless technologies (e.g., radio frequency, infrared, acoustic, optical, and so forth), or other connection technologies. The network 146 is representative of any type of communication network, including one or more of data networks or voice networks.

The inventory management system 116 may be executed on one or more servers 148. The servers 148 may be configured to execute one or more modules or software applications associated with the inventory management system 116. While the servers 148 are illustrated in FIG. 1 as being in a location outside of the facility 102, in other implementations, at least a portion of the servers 148 may be located at the facility 102. The servers 148 are discussed in more detail below with regard to FIG. 4.

By using the techniques described in this disclosure, the inventory management system 116 may be able to prepare for the arrival of the user 128 at the facility 102 such that a staged order 126 is ready for quick dispatch and delivery to the user 128. Furthermore, because the order has been previously processed before delivery by the inventory management system 116, the user 128 need not provide a means of payment, such as cash, check, credit card, and so forth. As a result, the user 128 is able to easily take delivery of the items 112 that they have ordered and be on their way.

Figure 2:
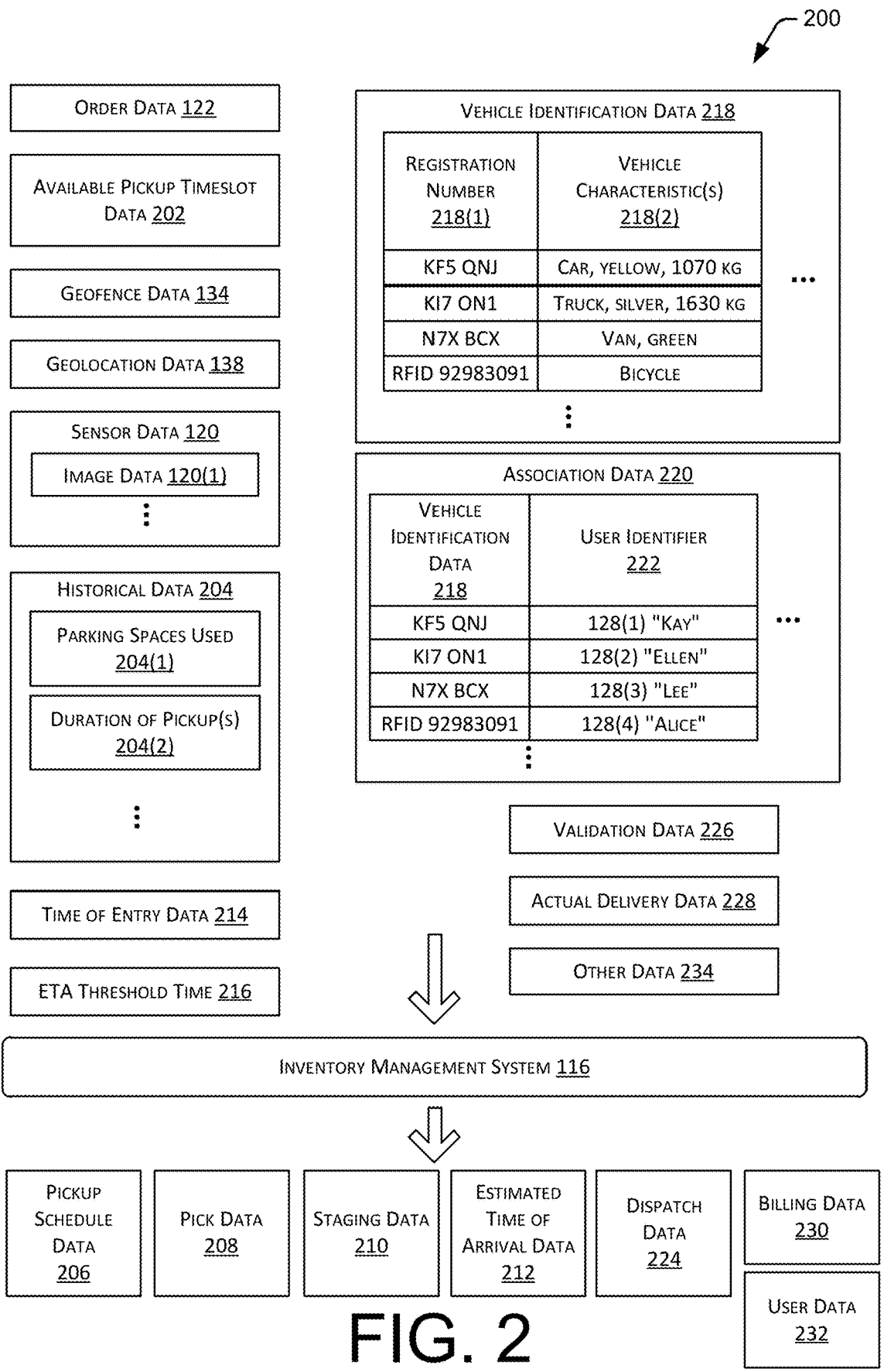
FIG. 2 illustrates data used by an inventory management system to facilitate operation of the pickup facility.

FIG. 2 illustrates diagrams 200 of data used by an inventory management system 116 to facilitate operation of the facility 102.

As described above, order data 122 provides information indicative of one or more items 112 that have been ordered by the user 128. The order data 122 may include information indicative of an item identifier, quantity, quality desired or grade, and so forth. For example, the order data 122 may include that the user 128 would like to take delivery of five grapefruits without blemishes.

Available pickup timeslot data 202 provides data indicative of the one or more dates and times at which the user 128 may pick up their order. The available pickup timeslot data 202 may be based on information such as staffing levels of the facility 102, currently scheduled pickups, number of parking spaces 106, service level agreement values, interaction data about previous interactions of the user 128 with the facility 102, and so forth. For example, the service level agreement values may indicate maximum wait times for users 128 to receive their orders, maximum time from dispatch to appearance of the attendant 140 at the parking space 106, and so forth.

As described above, the geofence data 134 provides data indicative of one or more geographic boundaries 136. For example, geofence data 134 may be indicative of street intersections that are a five-minute travel time from the facility 102. The geofence data 134 may be static or may be dynamic. For example, different geographic boundaries 136 may vary based on time of day, traffic conditions, congestion at the facility 102, and so forth.

The geolocation data 138, as described above, may comprise information indicative of a geographic location of one or more of the user 128, vehicle 108, or user device 130. For example, geolocation data 138 may indicate a time a user device 130 associated with the user 128 traversed the geographic boundary 136. In another example, the geolocation data 138 may indicate a geographic location of the user 128 or the user device 130 associated with the user 128. Continuing this example, the geographic location may indicate the latitude and longitude or a street address of the user 128 or the user device 130. The geographic location of the user 128 may be determined based on facial recognition using an image acquired by one or more cameras at a known geographic location. In another example, the geolocation data 138 may include a destination geolocation in use by the user device 130, such as a destination entered into navigational software. Geolocation data 138 may also include other information such as a heading or speed of one or more of the user 128, the vehicle 108, or the user device 130.

The geographic boundaries 136 may specify particular coordinates, street addresses, intersections, distances relative to a point, and so forth. The geographic boundary 136 may be selected or designated to provide a desired amount of time to the system to prepare the staged order 126 for pick up by the user 128.

The sensor data 120 comprises information acquired by one or more of the sensors 118. For example, where the sensors 118 comprise cameras, the sensor data 120 may include image data 120(1). In another example, where the sensors 118 include weight scales, the sensor data 120 may include weight data.

The inventory management system 116 may use historical data 204 during operation. The historical data 204 may be generated from sensor data 120, order data 122, from other inputs, or from internal processing performed by the inventory management system 116.

Historical data 204 may include information such as parking spaces used 204(1). The parking spaces used 204(1) provides information indicative of which parking spaces 106 a particular user 128 used during previous visits to the facility 102 or to other facilities 102. For example, the parking spaces used 204(1) may indicate that the user 128 typically parks in the last third of empty parking spaces 106. Other historical data 204 may include duration of pickups 204(2). The duration of pickups 204(2) provides information indicative of how long each pickup transaction took. In some implementations, the duration of pickups 204(2) may be measured from appearance of the attendant 140 at the parking space 106 until departure of the vehicle 108 from the parking space 106.

Other historical data 204 may also be acquired. The historical data 204 may include parking area data generated from sensor data 120 obtained from the one or more sensors 118. The parking area data may include one or more of the following: location of vehicles 108 in the parking area 104, movement of the vehicles 108 in the parking area 104, estimated load times associated with the vehicles 108 in the parking area 104, weather conditions at the parking area 104, and so forth. The historical data 204 may also include status of the facility 102 at a given time, such as staffing levels, actual delays, order processing times, dispatch times, number of orders modified, and so forth.

The inventory management system 116 may use the available pickup timeslot data 202 to generate pickup schedule data 206. The pickup schedule data 206 indicates when the user 128 is expected to arrive at the facility 102 to pick up their order. In some implementations described below, the available pickup timeslot data 202 may be based at least in part on the historical data 204 indicative of duration of pickup 204(2).

The inventory management system 116 may use the pickup schedule data 206 and the order data 122 to generate pick data 208. The pick data 208 may indicate particular items 112, the quantity of those items 112, a grade of the items 112, handling instructions, required completion time, and so forth. A picker may use the pick data 208 to retrieve one or more items 112 from the storage area 110. The picked one or more items 112 may then be placed into one or more staging locations 124 as the staged order 126 at the staging area 114. Staging data 210 may be generated by the inventory management system 116 indicating where the portions of the staged order 126 have been stored within the one or more staging locations 124. For example, staging data 210 may indicate that a first bag of the staged order 126 is stored in the refrigerated inventory staging location 124(1) on shelf A123 while a second bag of the staged order 126 is stored in the room temperature inventory staging location 124(2) on shelf C37.

The inventory management system 116 may receive or may generate estimated time of arrival (ETA) data 212. For example, the inventory management system 116 may receive geolocation data 138 indicating that the vehicle 108 of the user 128 has passed the geographic boundary 136 and is inbound to the facility 102. Based on the location of the geographic boundary 136 and the known location of the facility 102, the ETA data 212 may be generated. In another implementation, ETA data 212 may be based at least in part on user input. For example, the ETA data 212 may be based on a particular pickup timeslot selected by the user 128 and stored in the pickup schedule data 206.

The inventory management system 116 may receive or generate time of entry (TOE) data 214. The TOE data 214 indicates the entry to the facility 102 of the user 128, a vehicle 108 associated with the user 108, the user device 130, and so forth. For example, the TOE data 214 may be generated from a timestamp associated with image data 120(1) that depicts an image of the vehicle 108 entering the parking area 104. In another example, the TOE data 214 may be generated from an RFID reader configured to read an RFID tag on the vehicle 108 upon entering the parking area 104.

An ETA threshold time 216 may be specified. The ETA threshold time 216 indicates a window of time or a duration relative to the ETA data 212 within which TOE data 214 may be used to determine identity of the user 128, vehicle 108, and so forth. In one implementation, the ETA threshold time 216 may indicate a center time in a window make stand before and after the center time, or may indicate a start time and a stop time. For example, the ETA threshold time 216 may indicate a window of 60 seconds. The ETA data 212 may indicate that the user 128(1) is expected to arrive at 11:59:27 (hours:minutes:seconds) for a pickup timeslot of 12:00:00. A vehicle 108(1) may have TOE data 214(1) of 12:00:09. In this example, the TOE data 214(1) is within the ETA threshold time 216 of 60 seconds. As a result, the vehicle 108(1) is determined as being possibly associated with the user 128(1). In some implementations, a plurality of vehicles 108 may arrive contemporaneously with one another. In these implementations, other techniques may be used to disambiguate between the users 128 that are expected to be at the facility 102. For example, the attendant 140 may be dispatched to the parking space 106 and may ask for the name of the user 128. Once the identity of the user 128 is determined, the tote 144 may be fetched to that parking space 106 and the items 112 may be delivered to the user 128.

The ETA threshold time 216 may be manually specified, such as by an engineer or system administrator. In other implementations, the ETA threshold time 216 may be determined dynamically such as using one or more machine learning techniques and based on historical data 204.

Vehicle identification data 218 may be obtained about the vehicle 108. The vehicle identification data 218 may be configured to distinguish one vehicle 108 from another. In some implementations, the vehicle identification data 218 may be unique across a large grouping of vehicles 108, or the vehicle identification data 218 may be used to categorize the vehicle 108. The vehicle identification data 218 may include one or more of a registration number 218(1) (or portion thereof), a vehicle characteristic 218(2), and so forth. For example, vehicle identification data 218 may include a registration number 218(1) such as a license plate number, vehicle identification number (VIN), RFID tag number, optical tag or barcode number, and so forth. In some implementations, the vehicle identification data 218 may be associated with a particular component of the vehicle 108. For example, the registration number 218(1) may comprise an RFID tag present within a tire of the vehicle 108, data transmitted by a communication device, and so forth. Continuing the example, a communication device of the vehicle 108 may transmit a radio signal that contains information used to identify the vehicle 108. In some implementations, the data conveyed by the radio signal may comprise a media access control address, security set identifier (SSID), network address, and so forth.

The vehicle characteristics 218(2) may comprise other characteristics that may be suitable for categorizing a particular vehicle 108. The vehicle characteristics 218(2) may comprise other characteristics that may also be suitable for definitively identifying a particular vehicle 108. For example, the vehicle characteristics 218(2) may include a make, model, body style, color, weight, and so forth. Continuing the example, vehicle characteristics 218(2) may indicate the vehicle 108 is an automobile, bicycle, autonomous craft, and so forth.

In some implementations, the vehicle identification data 218 may be obtained by one or more sensors 118. For example, the registration number 218(1) (or a portion thereof) may be obtained from one or more sensors 118(1) such as a camera obtaining an image of a license plate and using optical character recognition techniques to read the characters of the license plate depicted therein. In some situations, the registration number 218(1) may be partially obscured, partially misread, and so forth. For example, a character on the license plate may be obscured by dirt or glare, resulting in determination of an erroneous registration number 218(1) that corresponds to at least a portion of that actually present on the vehicle 108. In other implementations, the vehicle identification data 218 may be provided from another source, such as a vehicle registration database.

Association data 220 provides data indicative of a relationship between vehicle identification data 218 and a user identifier 222. The user identifier 222 is indicative of a user identity of the user 128. For example, the user identifier 222 may comprise an account number, government issued identification number, legal name, username, and so forth. For example, the vehicle identification data 218 such as a registration number 218(1) of "KF5 QNJ" may be associated with the user identifier 222 of the user 128(1) named "Kay".

In some implementations, the association data 220 may be provided by the user 128. For example, during a registration to use the system described in this disclosure, the user 128 may provide information about their vehicle 108. Continuing the example, during a sign-in or registration process, the user 128 may include the license plate number or other vehicle identification data 218 indicative of the one or more vehicles 108 the user 128 may use to pick up orders from the facility 102. The inventory management system 116 may use the association data 220 to determine the identity of the user 128 upon entry of their vehicle 128 to the facility 102. For example, based on the detection of the vehicle identification data 218 and getting a license plate number of "KF5 QNJ", the inventory management system 116 may determine that the user 128(1) named "Kay" has entered the parking area 104.

In some situations, the association data 220 may not be available. For example, upon a first use of the facility 102 or after purchasing a new vehicle 108, there may be no vehicle identification data 218 associated with the particular user 128. In this situation, the inventory management system 116 may determine a list of likely user identifiers 222 based at least in part on the ETA data 212 and the TOE data 214 within a specified ETA threshold time 216. A plurality of vehicles 108 may enter the parking area 104 within the same ETA threshold time 216. Should this occur, the inventory management system 116 may use one or more additional techniques to determine which of the users 128 are at which of the parking spaces 106. For example, the attendant 140 may be prompted to ask for the name of the user 128 and may compare the information received against a list of the likely user identifiers 222.

The inventory management system 116 may generate dispatch data 224. The dispatch data 224 may comprise information of use by the attendant 140 in delivering the staged orders 126 to the vehicle 108 at a parking space 106. In one implementation, the dispatch data 224 may be generated, at least in part, prospectively before arrival of the vehicle 108 at the facility 102. For example, the dispatch data 224 may be generated based on the geolocation data 138 indicating the vehicle 108 has crossed a geographic boundary 136 and is inbound to the facility 102. Initial dispatch data 224 may include the staging locations 124 within the staging area 114 that portions of the staged order 126 are to be retrieved from. In some implementations, the initial dispatch data 224 may include a predicted parking space 106. As described below, the predicted parking space 106 may be determined based on historical data 204. After the arrival of the vehicle 108 and the determination of the actual parking space 106 of the vehicle 108, additional dispatch data 224 may be distributed to the attendant 140 to provide information about the actual parking space 106. For example, a display on the attendant device 142 may be updated to include the actual parking space 106 that the vehicle 108 is parked in.

Validation data 226 may be generated that associates a particular user identifier 222 with other information such as vehicle identification data 218, image data 120(1) of the particular user 128, and so forth. The validation data 226 may comprise a confirmation or acceptance of an automatically generated association. For example, validation data 226 may indicate the acceptance by the attendant 140 of an association between vehicle identification data 218 and a particular user identifier 222. In other implementations, the validation data 226 may be generated based on sensor data 120. For example, image data 120(1) of a face of the user 128 as they wait in their vehicle 108 may be processed using one or more facial recognition techniques to compare the face of the user 128 with previously stored facial information in an attempt to identify the user 128. A correspondence between the face of the user 128 and the stored facial information may result in validation of the user identifier 222.

The inventory management system 116 may be configured to generate actual delivery data 228. The actual delivery data 228 may indicate information such as the items 112 that have been physically transferred to the custody of the user 128, such as having been loaded within the vehicle 108. The actual delivery data 228 may include other information such as a time, weight, item count, user feedback, and so forth. The actual delivery data 228 may also indicate changes relative to the order data 122. For example, the actual delivery data 228 may indicate that the user 128 refused a particular item 112 while adding another item 112 to their order. The inventory management system 116 may use the actual delivery data 228, the order data 122, and other information to maintain information about the inventory levels at the facility 102.

The inventory management system 116 may generate billing data 230 indicative of the one or more items 112 that were transferred to the custody of the user 128 or were received from the user 128. For example, the billing data 230 may indicate that the user 128 purchased $45 worth of items 112(1) and returned $7 worth of items 112(2).

The inventory management system 116 may generate, maintain, or access user data 232. The user data 232 provides information about the particular user 128. The user data 232 may be associated with a particular user identifier 222. The user data 232 may comprise information about the user 128 such as name, account or billing information, personal preferences, demographic data, and so forth. For example, the personal preferences may include packaging preferences, loading preferences, and so forth. Continuing the example, the user 128 may specify that they wish to only use paper sacks made from recycled materials and that they prefer to have their items 112 loaded on the left side of the vehicle 108.

In some implementations, the user data 232 may also include information about interactions of the user 128 with the facility 102 or personnel such as information provided by the attendant 140. For example, the user data 232 may comprise information acquired from the attendant 140 during or after interaction with the user 128, such as whether the user 128 was easy to work with, any challenges the attendant 140 encountered while serving the user 128, and so forth. The inventory management system 116 may utilize the user data 232 to schedule pickup times, designate a particular attendant 140 to serve the user 128, and so forth. For example, the user 128 that is more challenging to work with may be assigned a particular attendant 140, may be allocated more time for pickup, and so forth.

Other data 234 may also be used by the inventory management system 116. For example, the other data 234 may include item data indicative of environmental or storage requirements for a particular item 112 or category of item 112. For example, where the item 112 includes ice cream, the item data may indicate that this particular item 112 is to be stored at temperatures below freezing.

In some implementations, the inventory management system 116 may acquire information from other systems and use this information to provide services within the facility 102. For example, the user 128 may allow the inventory management system 116 to receive information from one or more social networking websites. In this example, where the user 128 purchases a new vehicle 108 and then discusses the new vehicle 108 on their social media account, the inventory management system 116 may be configured to recognize the new vehicle 108 upon its arrival at the facility 102.

Figure 3:
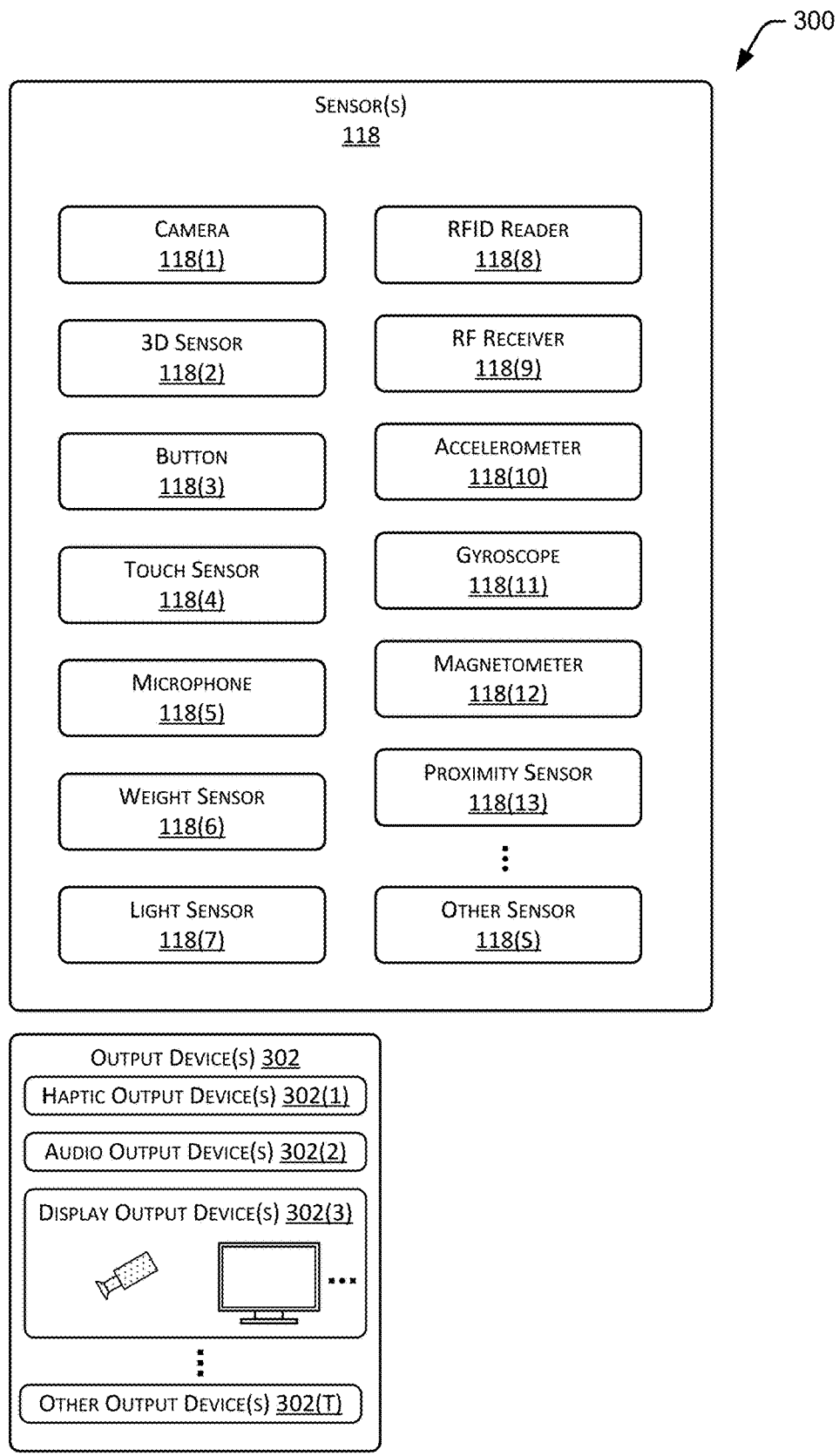
FIG. 3 illustrates sensors and output devices that may be utilized by the devices described in this disclosure.

FIG. 3 illustrates a block diagram 300 of sensors 118 and output devices 302 that may be utilized by the devices and systems described in this disclosure. Generally, the inventory management system 116 or other systems associated with the facility 102 may include any number and combination of input components, output components, and servers 148.

The one or more sensors 118 may be arranged at one or more locations within the facility 102, outside of the facility 102, upon approach to the facility 102, or off-site from the facility 102. For example, the sensors 118 may be mounted in the parking area 104. In some implementations, the sensors 118 may be mounted in or carried by the vehicle 108, user 128, user device 130, the tote 144, and so forth.

The sensors 118 may include one or more cameras 118(1), which may be configured to acquire images of a scene. The cameras 118(1) may also be configured to detect light in one or more wavelengths including, but not limited to, terahertz, infrared, visible, ultraviolet, and so forth. The inventory management system 116 may use image data 120(1) acquired by the cameras 118(1) during operation of the facility 102. For example, the inventory management system 116 may identify vehicles 108, items 112, users 128, attendants 140, totes 144, and so forth, based at least in part on their appearance within the image data 120(1).

One or more 3D sensors 118(2) may also be included in the sensors 118. The 3D sensors 118(2) may be configured to acquire spatial or three-dimensional data, such as depth information, about objects within the field of view (FOV) of the sensor 118. The 3D sensors 118(2) include range cameras, lidar systems, sonar systems, radar systems, structured light systems, stereo vision systems, optical interferometry systems, and so forth. The inventory management system 116 may use the three-dimensional data acquired by the 3D sensors 118(2) to identify objects, determine one or more of a location, orientation, or position of an object, and so forth. Location is where in space an object is. For example, the location may be specified as X and Y coordinates relative to an origin, where X and Y are mutually orthogonal. In comparison, orientation may be indicative of a direction the object (or a portion thereof) is facing. For example, the orientation may be that the user 128 is facing south. Position may provide information indicative of a physical configuration or pose of the object, such as the arms of the user 128 are stretched out to either side. Pose provides information on a relative configuration of one or more elements of an object. For example, the pose of the user's 128 hand may indicate the user 128 pointing at an item 112.

One or more buttons 118(3) may be configured to accept input from the user 128. The buttons 118(3) may comprise mechanical, capacitive, optical, or other mechanisms. For example, the buttons 118(3) may comprise mechanical switches configured to accept an applied force from a touch of the user 128 to generate an input signal. The inventory management system 116 may use data from the buttons 118(3) to receive information from the user 128. For example, the buttons 118(3) may be used to accept input from a user 128 such as a username and password associated with an account, or from an attendant 140 such as validation data 226.

The sensors 118 may include one or more touch sensors 118(4). The touch sensors 118(4) may use resistive, capacitive, surface capacitance, projected capacitance, mutual capacitance, optical, Interpolating Force-Sensitive Resistance (IFSR), or other mechanisms to determine the point of a touch or near-touch. For example, the IFSR may comprise a material configured to change electrical resistance responsive to an applied force. The point of that change in electrical resistance within the material may indicate the point of the touch. The inventory management system 116 may use data from the touch sensors 118(4) to receive information from the user 128 or attendant 140. For example, the touch sensor 118(4) may be integrated with the tote 144 to provide a touchscreen with which the attendant 140 may select one of a list of possible user identifiers 222 in order to generate validation data 226.

One or more microphones 118(5) may be configured to acquire audio data indicative of sound present in the environment. The sound may include speech uttered by the user 128, attendant 140, and so forth. In some implementations, arrays of microphones 118(5) may be used. These arrays may implement beamforming or other techniques to provide for directionality of gain. The inventory management system 116 may use the one or more microphones 118(5) to accept voice input from the user 128, determine the location of vehicles 108 within the parking area 104, and so forth.

One or more weight sensors 118(6) may be configured to measure the weight of a load, such as the vehicle 108, the item 112, the user 128, the tote 144, and so forth. The weight sensors 118(6) may be configured to measure the weight of the load at one or more of the parking area 104, the storage area 110, the staging area 114, and so forth. The weight sensors 118(6) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. The inventory management system 116 may use the data acquired by the weight sensors 118(6) to identify an object, determine a location of an object, maintain shipping records, and so forth. For example, the weight sensors 118(6) at an approach to the parking area 104 may report a weight of the vehicle 108, indicating the vehicle 108 is present at that location. In some implementations, the weight data produced by the one or more weight sensors 118(6) may be used to identify the vehicle 108, the user 128, the attendant 140, the tote 144, and so forth.

The sensors 118 may include one or more light sensors 118(7). The light sensors 118(7) may be configured to provide information associated with ambient lighting conditions such as a level of illumination. Information acquired by the light sensors 118(7) may be used by the inventory management system 116 to adjust a level, intensity, or configuration of output devices 302 such as described below.

One more radio frequency identification (RFID) readers 118(8), near field communication (NFC) systems, and so forth, may also be provided as sensors 118. For example, the RFID readers 118(8) may be configured to read the RF tags. Information acquired by the RFID reader 118(8) may be used by the inventory management system 116 to identify an object associated with the RF tag such as the item 112, the user 128, the tote 144, and so forth.

One or more RF receivers 118(9) may also be provided as sensors 118. In some implementations, the RF receivers 118(9) may be part of transceiver assemblies. The RF receivers 118(9) may be configured to acquire radio frequency (RF) signals associated with Wi-Fi, Bluetooth, ZigBee, 3G, 4G, LTE, or other wireless data transmission technologies. The RF receivers 118(9) may provide information associated with data transmitted via radio frequencies, signal strength of RF signals, and so forth. For example, information from the RF receivers 118(9) may be used by the inventory management system 116 to determine a location of an RF source such as a user device 130 carried by the user 128, a wireless navigation device in use by a vehicle 108, and so forth.

The sensors 118 may include one or more accelerometers 118(10), which may be worn or carried by the user 128, mounted to the tote 144, and so forth. The accelerometers 118(10) may provide information such as the direction and magnitude of an imposed acceleration. Data such as rate of acceleration, determination of changes in direction, speed, and so forth, may be determined using the accelerometers 118(10).

A gyroscope 118(11) provides information indicative of rotation of an object affixed thereto. For example, the tote 144 or other objects or devices may be equipped with a gyroscope 118(11) to provide data indicative of a change in orientation.

A magnetometer 118(12) may be used to determine a heading by measuring ambient magnetic fields, such as the terrestrial magnetic field. The magnetometer 118(12) may be worn or carried by the attendant 140, mounted to the tote 144, and so forth. For example, the magnetometer 118(12) mounted to the tote 144 may act as a compass and provide information indicative of which way the tote 144 is moving.

A proximity sensor 118(13) may be used to determine presence of an object, such as the vehicle 108, user 128, tote 144, and so forth. The proximity sensors 118(13) may use optical, electrical, ultrasonic, electromagnetic, or other techniques to determine a presence of an object. For example, the proximity sensor 118(13) may comprise an inductive loop configured to determine proximity of the metal in the vehicle 108. Continuing the example, the inductive loop may be embedded within, or placed below, the surface of the parking area 104.

In some implementations, the proximity sensors 118(13) may use an optical emitter and an optical detector to determine proximity of an object. For example, an optical emitter may emit light, a portion of which may then be reflected by the object back to the optical detector to provide an indication that the object is proximate to the proximity sensor 118(13). In other implementations, the proximity sensors 118(13) may comprise a capacitive proximity sensor 118(13) configured to provide an electrical field and determine a change in electrical capacitance due to presence or absence of an object within the electrical field. For example, a capacitive proximity sensor 118(13) may be used to determine a presence of the vehicle 108 at a particular parking space 106.

The sensors 118 may include other sensors 118(5) as well. For example, the other sensors 118(5) may include pneumatic road tube counters, ultrasonic rangefinders, thermometers, barometric sensors, hygrometers, rain gauges, biometric input devices including, but not limited to, fingerprint readers or palm scanners, and so forth.

The facility 102 may include one or more access points (not depicted) configured to establish one or more wireless networks. The access points may use Wi-Fi, NFC, Bluetooth, or other technologies to establish wireless communications between a device and the network 146. The wireless networks allow the devices to communicate with one or more of the inventory management system 116, the sensors 118, attendant devices 140, other user devices 130, and so forth.

Output devices 302 may also be provided in the facility 102. The output devices 302 are configured to generate signals that may be perceived by a human, such as the user 128 or the human attendant 140.

Haptic output devices 302(1) are configured to provide a signal that results in a tactile sensation to the human. The haptic output devices 302(1) may use one or more mechanisms such as electrical stimulation or mechanical displacement to provide the signal. For example, the haptic output devices 302(1) may be configured to generate a modulated electrical signal that produces an apparent tactile sensation in one or more fingers of the human. In another example, the haptic output devices 302(1) may comprise piezoelectric or rotary motor devices configured to provide a vibration that may be felt by the human.

One or more audio output devices 302(2) are configured to provide acoustic output. The acoustic output includes one or more of infrasonic sound, audible sound, or ultrasonic sound. The audio output devices 302(2) may use one or more mechanisms to generate the sound. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display output devices 302(3) may be configured to provide output that may be seen by a human or detected by a light-sensitive detector such as a camera 118(1) or light sensor 118(7). The output from the display output devices 302(3) may be monochrome or color. The display output devices 302(3) may be emissive, reflective, or both emissive and reflective. An emissive display output device 302(3) is configured to emit light during operation. For example, a light emitting diode (LED) is an emissive display output device 302(3). In comparison, a reflective display output device 302(3) relies on ambient light to present an image. For example, electrophoretic displays, flip-disc displays, split-flap displays, and so forth are reflective display output devices 302(3). Backlights or front lights may be used to illuminate the reflective display output device 302(3) to provide visibility of the information on the electrophoretic display in conditions where the ambient light levels are low.

Mechanisms of the display output devices 302(3) may include liquid crystal displays, transparent organic LEDs, electrophoretic displays, image projectors, or other display mechanisms. The other display mechanisms may include, but are not limited to, microelectromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display output devices 302(3) may be configured to present images. For example, the display output devices 302(3) may comprise a pixel-addressable display. The image may comprise at least a two-dimensional array of pixels or a vector representation of an at least two-dimensional image.

In some implementations, the display output devices 302(3) may be configured to provide non-image data, such as text characters, colors, and so forth. For example, a segmented electrophoretic display, segmented LED, and so forth, may be used to present information such as a stock keeping unit (SKU) number. The display output devices 302(3) may also be configurable to vary the color of the text, such as using multicolor LED segments.

In some implementations, display output devices 302(3) may be configurable to provide image or non-image output. For example, an electrophoretic display output device 302(3) with addressable pixels may be used to present images of text information, or all of the pixels may be set to a solid color to provide a colored panel.

The output devices 302 may include hardware processors, memory, and other elements configured to present a user interface. In one implementation, the display output devices 302(3) may be arranged along the edges of inventory locations within the storage area 110 of the facility 102.

Other output devices 302(T) may also be present at the facility 102. The other output devices 302(T) may include lights, scent/odor dispensers, document printers, three-dimensional printers or fabrication equipment, and so forth. For example, the other output devices 302(T) may include lights that are located on the inventory locations in the storage area 110, the totes 144, and so forth.

In some implementations, one or more items 112 may be fabricated using an output device 302 such as a 3D printer. For example, the order data 122 may include an order for a customized or semi-customized item 112 that is personalized to the user 128. The 3D printer may fabricate at least a portion of the customized or semi-customized item 112, which may be then delivered to the user 128.

Figure 4:
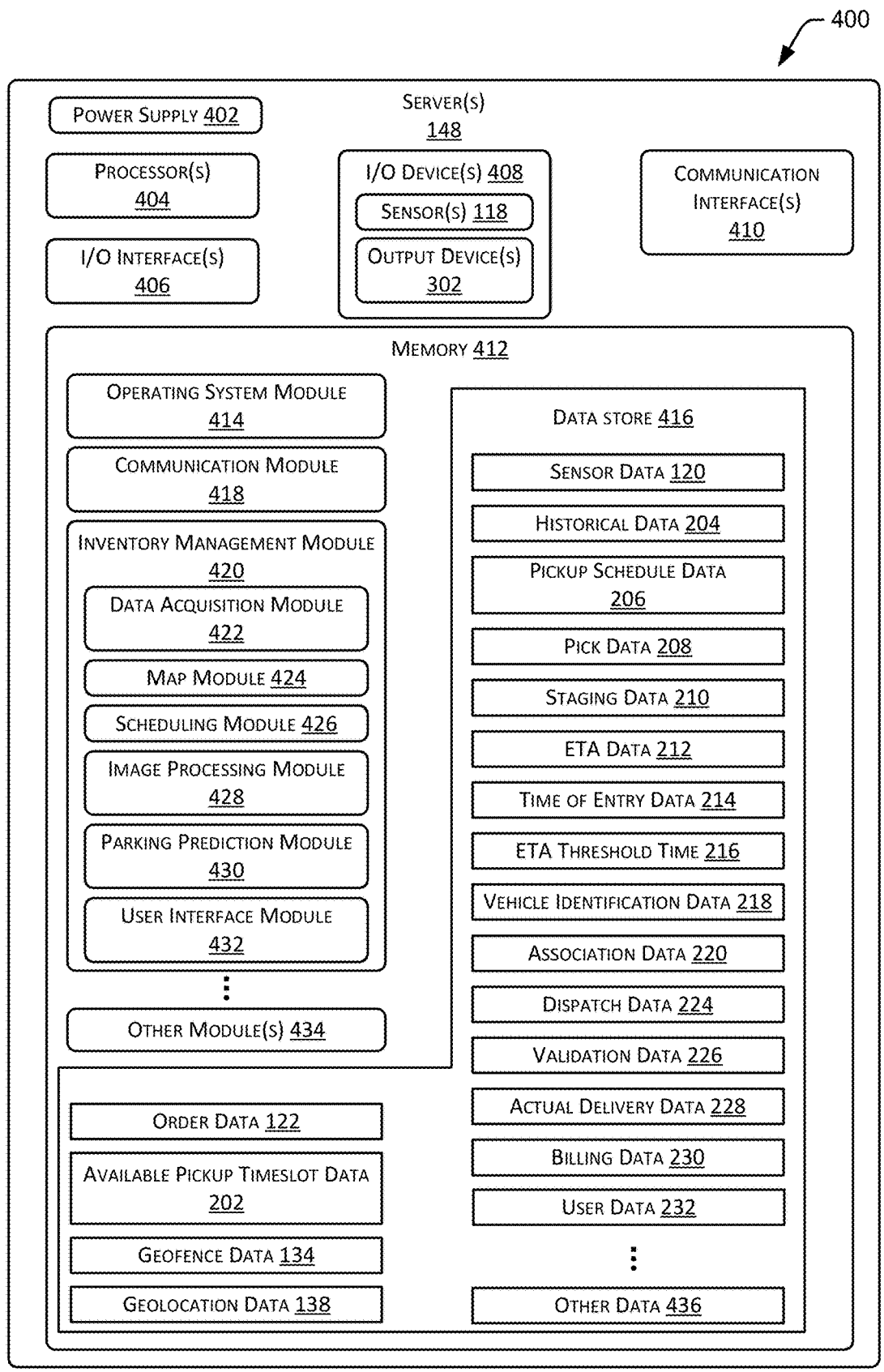
FIG. 4 illustrates a block diagram of a server configured to stage an order, associate a user identity with a vehicle entering the pickup facility, and dispatch the staged order to the parking space of the user.

FIG. 4 illustrates a block diagram 400 of a server 148 configured to stage an order, associate a user identity with a vehicle 108 entering the facility 102, and dispatch the staged order 126 to the parking space 106 of the user 128 in the parking area 104.

The server 148 may be physically present at the facility 102, may be accessible by the network 146, or a combination of both. The server 148 does not require end-user knowledge of the physical location and configuration of the system that delivers the services. Common expressions associated with the server 148 may include "on-demand computing," "software as a service (SaaS)," "platform computing," "network-accessible platform," "cloud services," "data centers," and so forth. Services provided by the server 148 may be distributed across one or more physical or virtual devices.

A power supply 402 is configured to provide electrical power suitable for operating the components in the server 148. The power supply 402 may comprise one or more of power conditioning devices, batteries, wireless power receivers, fuel cells, capacitors, and so forth. For example, the power supply 402 may be configured to convert alternating current in a line voltage to low-voltage direct current sufficient to operate the components of the server 148.

The server 148 may include one or more hardware processors 404 (processors) configured to execute one or more stored instructions. The processors 404 may comprise one or more cores. The server 148 may include one or more input/output (I/O) interface(s) 406 to allow the processor 404 or other portions of the server 148 to communicate with other devices. The I/O interfaces 406 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 406 may couple to one or more I/O devices 408. The I/O devices 408 may include input devices such as one or more of a keyboard, mouse, scanner, sensor 118, and so forth. The I/O devices 408 may also include output devices 302 such as one or more of a display output device 302(3), printer, audio output device 302(2), and so forth. In some embodiments, the I/O devices 408 may be physically incorporated with the server 148 or may be externally placed.

The server 148 may also include one or more communication interfaces 410. The communication interfaces 410 are configured to provide communications between the server 148 and other devices, such as the sensors 118, routers, access points, and so forth. The communication interfaces 410 may include devices configured to couple to personal area networks (PANs), wired and wireless local area networks (LANs), wired and wireless wide area networks (WANs), and so forth. For example, the communication interfaces 410 may include devices compatible with Bluetooth, Ethernet, Wi-Fi, and so forth.

The server 148 may also include one or more busses or other internal communications hardware or software that allow for the transfer of data between the various modules and components of the server 148.

As shown in FIG. 4, the server 148 includes one or more memories 412. The memory 412 comprises one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 412 provides storage of computer-readable instructions, data structures, program modules, and other data for the operation of the server 148. A few example functional modules are shown stored in the memory 412, although the same functionality may alternatively be implemented in hardware, firmware, or as a system on a chip (SOC).

The memory 412 may include at least one operating system (OS) module 414. The OS module 414 is configured to manage hardware resource devices such as the I/O interfaces 406, the I/O devices 408, the communication interfaces 410, and provide various services to applications or modules executing on the processors 404. The OS module 414 may implement a variant of the FreeBSD operating system as promulgated by the FreeBSD Project; other UNIX or UNIX-like variants; a variation of the Linux operating system as promulgated by Linus Torvalds; the Windows Server operating system from Microsoft Corporation of Redmond, Wash., USA; and so forth.

The memory 412 may also include a data store 416 to store information. The data store 416 may use a flat file, database, linked list, tree, executable code, script, or other data structure to store the information. In some implementations, the data store 416 or a portion of the data store 416 may be distributed across one or more other devices including other servers 148, network attached storage devices, and so forth. The data store 416 may be configured to store the data described above with regard to FIG. 2. Also stored in the memory 412 may be one or more of the following modules. These modules may be executed as foreground applications, background tasks, daemons, and so forth.

A communication module 418 may be configured to establish communications with one or more of the sensors 118, other servers 148, or other devices. The communications may be authenticated, encrypted, and so forth.

The memory 412 may store an inventory management module 420. The inventory management module 420 is configured to provide the inventory functions as described herein with regard to the inventory management system 116. For example, the inventory management module 420 may track items 112 between different locations in the facility 102, to and from the totes 144, generate pick data 208, and so forth. The inventory management module 420 may include one or more of a data acquisition module 422, a map module 424, a scheduling module 426, an image processing module 428, a parking prediction module 430, a user interface module 432, or other modules 434.

Other data 436 may also be stored in the data store 416. The data acquisition module 422 is configured to acquire sensor data 120 from one or more of the sensors 118. For example, the data acquisition module 422 may be configured to receive image data 120(1) comprising images from the cameras 118(1), weight data from weight sensors 118(6), and so forth.

The sensor data 120 may be stored using the data store 416. The sensor data 120 comprises information acquired from, or based on, the one or more sensors 118. As described above, in some implementations, the sensors 118 may include a camera 118(1) that is configured to acquire one or more images. These images may be stored as image data 120(1). The image data 120(1) may comprise information descriptive of a plurality of picture elements or pixels. In other implementations, the weight sensors 118(6) are configured to acquire weight data representative of the weight of objects, such as at an entrance to the facility 102 or at a parking space 106. Other sensor data 120 such as audio data from the one or more microphones 120(5), proximity data from proximity sensors 118(13), and so forth, may also be stored in the data store 416.

In some implementations, the data acquisition module 422 may analyze the sensor data 120 to generate additional information. For example, the data acquisition module 422 may process the sensor data 120 to identify a user 128, determine a particular gesture such as a hand of the user 128 taking an item 112 from the tote 144 during pickup, and so forth. The data may be stored, at least in part, using the data store 416. In some implementations, a portion of the data may be retrieved from other data stores or devices.

The map module 424 is configured to provide information indicative of a relative arrangement of geographic locations. For example, the map module 424 may map information of the city including streets, intersections, and the physical dimensions thereof. The map module 424 may be used to generate the geofence data 134. For example, the map module 424 may be used to determine a geographic boundary 136 which is 10 minutes travel time from the facility 102. The map module 424 may be configured to accept data from external sources such as current traffic and weather conditions. The map module 424 may also process the geolocation data 138 to determine the ETA data 212.

In some implementations, the ETA data 212 may be based at least in part on previously acquired TOE data 214 as compared to previously generated ETA data 212. For example, due to local conditions such as weather, road construction, special events, and so forth, users 128 arriving at a particular facility 102 may be an average of 5 minutes late. The ETA data 212 for subsequent arrivals may be adjusted to include this variation.

The scheduling module 426 is configured to generate available pickup timeslot data 202. The scheduling module 426 may access information such as the historical data 204, user data 232, and so forth. For example, an estimated duration of a future pickup may be determined based on one or more of the duration of pickup(s) 204(2) that have occurred previously, user data 232 indicating the user 128 requires special assistance or that the user 128 is difficult to work with, order data 122 such as number of items 112 to be picked up, and so forth. The determination of the estimated duration of a future pickup may also be based on other information, such as weather conditions, performance of attendants 140, and so forth. For example, icy conditions in the parking area 104 may slow down the pickup process.

The scheduling module 426 may use the estimated duration of the future pickup to determine information such as available pickup timeslot data 202. In one implementation, the scheduling module 426 may use the estimated duration of a future pickup to present particular available pickup timeslots at the facility 102 that have a duration greater than or equal to the estimated duration. For example, due to the size of the order and user data 232, the estimated duration of the future pickup may be 12 minutes. The scheduling module 426 may be configured to provide the user 128 with timeslots to pick up their order that have at least 12 minutes. This is discussed in more detail below with regard to FIG. 5.

The image processing module 428 is configured to use one or more techniques to generate data based on image data 120(1). For example, the image processing module 428 may use facial recognition techniques to analyze facial characteristics that are indicative of one or more facial features in an image, three-dimensional data, or both. For example, the face of the user 128 may be detected within one or more images of the image data 120(1). The facial features may include measurements of, or comparisons between, facial fiducials or ordinal points. The facial features may include eyes, mouth, lips, nose, chin, ears, face width, skin texture, three-dimensional shape of the face, presence of eyeglasses, and so forth. In some implementations, the facial characteristics may include facial metrics. The facial metrics indicate various ratios of relative sizes and spacing of the facial features. For example, the facial metrics may include a ratio of interpupillary distance to facial width, ratio of eye width to nose width, and so forth. In some implementations, the facial characteristics may comprise a set of eigenvectors by using principal component analysis (PCA) on a set of images. These eigenvectors as descriptive of a human face may be known as "eigenfaces" or "eigenimages".

The image processing described in this disclosure may be performed at least in part by using one or more of the following tools or techniques. In one implementation, the facial recognition or other image processing techniques described in this disclosure may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the image data 120(1). In some implementations, the EyeFace SDK as promulgated by Eyedea Recognition Ltd. of Prague, Czech Republic, may be used to process the image data 120(1). In other implementations, the OpenBR library and tools as originated by MITRE Corporation of Bedford, Mass., USA, and McLean, Va., USA, and promulgated by the OpenBR group at openbiometrics.org may also be used for image processing.

Other techniques such as artificial neural networks (ANN), active appearance models (AAM), active shape models (ASM), PCA, and so forth, may also be used to process the image data 120(1). For example, the ANN may be a trained using a supervised learning algorithm such that object identifiers are associated with images of particular objects within training images provided to the ANN. Once trained, the ANN may be provided with the image data 120(1) and may provide as output the object identifier. Other techniques may also be used to identify objects. For example, cascade classifiers, support vector machines, and so forth, may be used to process the image data 120(1) and identify an object.

In other implementations, other techniques may be used to recognize objects such as faces. Previously stored registration data may associate particular facial characteristics with a particular identity, such as represented by a user account. For example, the particular pattern of eigenvectors in the image may be sought in the previously stored data, and correspondence within a threshold tolerance may indicate identity of the user 128. The eigenvectors or other measurements may be compared with previously stored characteristics to determine the identity of the user 128 in the image or to distinguish one user 128 from another.

Techniques may be used by the image processing module 428 to recognize other objects such as vehicles 108. For example, the image processing module 428 may be configured to process the image data 120(1) using optical character recognition techniques to read the vehicle identification data 218, such as a license plate number.

The image processing module 428 may use information from other sources to assist in object identification. For example, weight data acquired by one or more weight sensors 118(6) may be used as an input to aid in object recognition by adding or removing objects from a set of possible objects to recognize, based on weight.

The parking prediction module 430 is configured to determine at which parking space 106 the user 128 is expected to park in. By accurately predicting the parking space 106 or a portion of the parking area 104 within which the user 128 is likely to park their vehicle 108, the attendant 140 with the tote 144 containing the items 112 that have been ordered may be dispatched to that location. As a result, the wait time of the user 128 once they park in the parking space 106 of the parking area 104 may be reduced.

The predicted parking space 106 may be expressed with different levels of specificity or granularity. For example, the predicted parking space 106 may indicate an individual parking space such as parking space 106(1) or a range or grouping of parking spaces such as parking spaces 106(20)-106(30). The predicted parking space 106 may be determined based on information such as the historical data 204, current parking area data generated from sensor data 120, and so forth. For example, the historical data 204 of parking spaces used 204(1) by one or more of the user 128, the vehicle 108, and so forth, may be used by the parking prediction module 430 to predict where the user 128 is likely to park. Continuing the example, when the user 128 is driving a first vehicle 108(1) such as a car, the user 128 may be more likely to park closer to the exit of the parking area 104 when the parking area 104 is congested. In comparison, the same user 128 while driving a second vehicle 108(2), that is larger than the first vehicle 108(1), may be more likely to park closer to the entrance of the parking area 104 where there is more space between cars in the adjacent parking spaces 106. The parking prediction module 430 may thus account for different combinations of user 128 and vehicle 108.

Based on the geolocation data 138 and an associated user identifier 222, the parking prediction module 430 may access historical data 204 such as the parking spaces used 204(1). As described above, parking spaces used 204(1) data provides information indicative of where within one or more of the parking area 104 or another parking area 104 such as at another facility 102 the user 128 has parked on previous visits. Based at least in part on the historical data 204, a predicted parking space 106 or group of predicted parking spaces 106 may be designated. In some implementations, the determination may also be based at least in part on the current parking area data.

In some implementations, the parking prediction module 430 may utilize other information as well to estimate where the user 128 will park. This information may include, but is not limited to, one or more of location of vehicles 108 in the parking area 104, movement of the vehicles 108 in the parking area 104, estimated load times associated with the vehicles 108 (or users 128) in the parking area 104, weather conditions at the parking area 104, and so forth.

In another example, sensor data 120 may indicate that the outside temperature is below freezing, and the image data 120(1) may indicate that portions of the parking area 104 are covered in snow. Based on this information, the parking prediction module 430 may predict that the user 128 is likely to park as close to the exit to the staging area 114 as possible.

The user interface module 432 is configured to generate user interface data. The user interface data may comprise commands, instructions, tags, markup language, images, color values, text, or other data. For example, the user interface data may be expressed as Hypertext Markup Language (HTML), Cascading Style Sheets (CSS), JavaScript, and so forth. The user interface data may be provided to one or more devices such as the user devices 130, the attendant devices 142, and so forth. For example, the user interface module 432 may be configured to use the dispatch data 224 to generate the user interface data for presentation to the attendant 140 by way of the attendant device 142. One or more output devices 302 are configured to use the user interface data to present the user interface which may be perceived by a human. The user interface may include one or more elements including visual, haptic, audible, olfactory, and so forth. For example, the user interface may be a graphical user interface (GUI), audible user interface, haptic user interface, or a combination thereof.

Other modules 434 may also be present in the memory 412. For example, a billing module may be configured to use the actual delivery data 228 to generate the billing data 230.

The data store 416 may also include other data 436. For example, the other data 436 may include information such as configuration files, status of the attendants 140, and so forth.

Other computing devices, such as user devices 130, may include one or more components similar to or the same as those described above with regard to the server 148. For example, the user device 130 may include a power supply 402, processor 404, I/O interfaces 406, I/O devices 408, communication interfaces 410, memory 412, and so forth.

Illustrative User Interfaces and Processes

Figure 5:
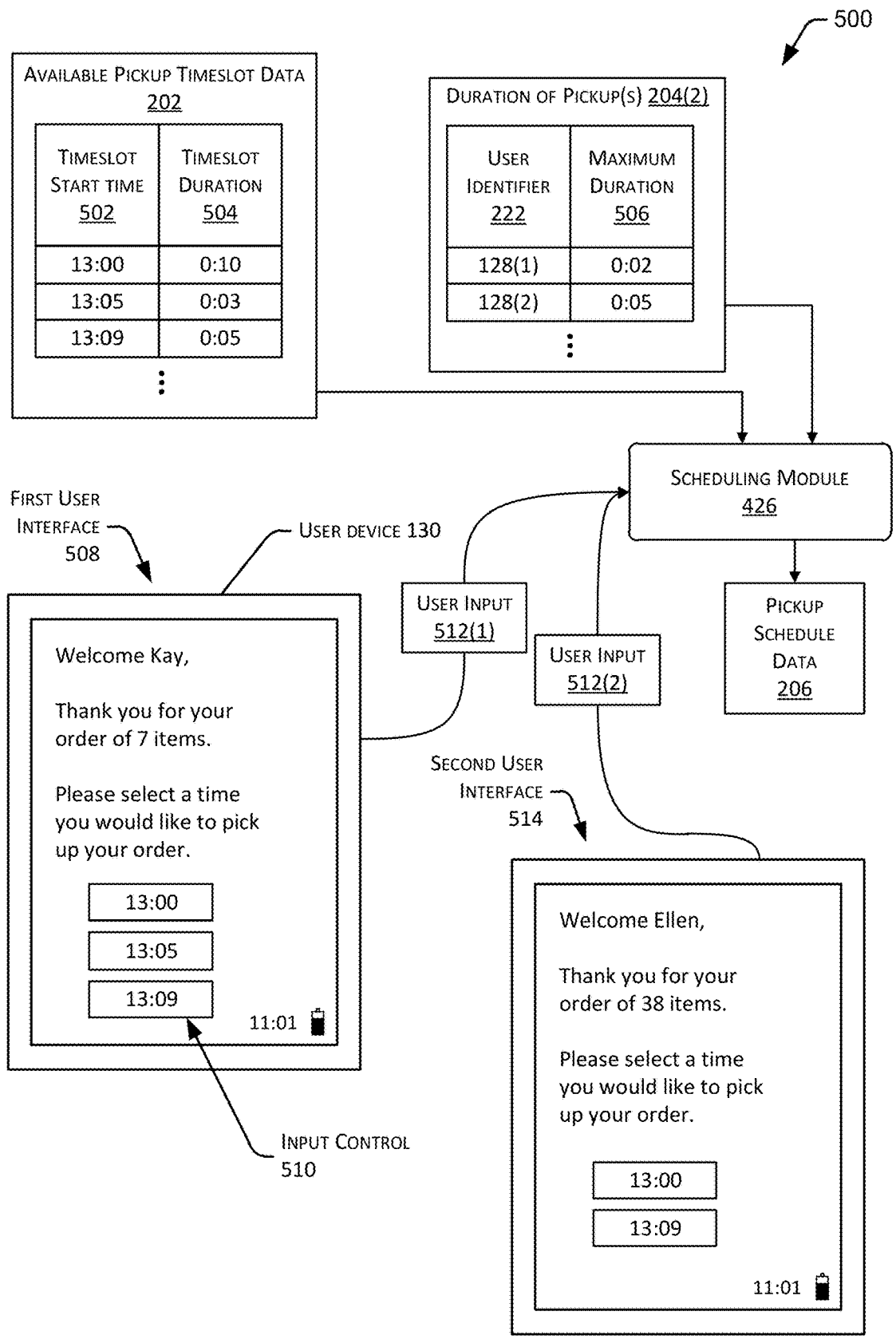
FIG. 5 illustrates user interfaces for a user to select an available pickup timeslot at the pickup facility, with the set of the available pickup timeslots as presented being based at least in part on the duration of prior pickups by the user.

FIG. 5 illustrates user interfaces 500 for a user 128 to select an available pickup timeslot at the facility 102, with the set of the available pickup timeslots presented based at least in part on the historical data 204, such as the duration of pickups 204(2) that have previously occurred.

As described above, the available pickup timeslot data 202 comprises information indicative of times when the user 128 may arrive at the facility 102 to pick up their order. The available pickup timeslot data 202 may include a timeslot start time 502 and a timeslot duration 504. The timeslot start time 502 indicates a clock time at the facility 102 that may have capacity to deliver the items 112 ordered to the user 128. Timeslot duration 504 may indicate an estimated amount of time that the particular timeslot is allocated. The available pickup timeslot data 202 may be based at least in part on the capacity of the facility 102, number of attendants 140 available, skill of the attendants 140, weather conditions, size of the staged orders 126, and so forth.

The duration of pickup 204(2) may include information indicative of the user identifier 222 and other information such as a maximum duration 506. While the examples described in FIG. 5 use maximum duration 506, in other implementations, other values may be used such as an average duration, median duration, and so forth. Different users 128 may experience different pickup durations for a variety of reasons. For example, the user 128(1) may typically have orders for a relatively small number of light-weight items 112 that lend themselves to being rapidly transferred to the vehicle 108. In comparison, the user 128(2) may be more likely to return or exchange fruits or vegetables, add additional items 112 to their order, or engage in other transactions that may extend their visit to the facility 102.

The inventory management system 116, such as the scheduling module 426, may use the available pickup timeslot data 202 and the duration of pickup 204(2) data to provide a list of possible pickup times that the user 128 may select from. This information may be presented to the user 128 via a user interface displayed on the user device 130, vehicle 108, or another device.

For example, the first user interface 508 is associated with the user 128(1) and is based on one or more of the historical data 204 of the user 128(1) or other information such as the order data 122. The user 128(1) is presented in this illustration with three pickup timeslots and an input control 510 allowing the user 128(1) to select the desired pickup timeslot. The user 128(1) may enter a selection that is provided as user input 512(1) to the scheduling module 426. The scheduling module 426 may use the user input 512(1) to generate or update pickup schedule data 206. In this example, the pickup schedule data 206 may be updated to indicate that the user 128(1) will be picking up their order at 13:00.

A second user interface 514 is depicted for a second user 128(2). Based on one or more of the historical data 204 associated with the user 128(2), order data 122, or other information, the scheduling module 426 may determine that the timeslot duration 504 will likely last at least five minutes. As a result, the second user interface 514 omits the 13:05 timeslot as its timeslot duration 504 is less than the maximum duration 506 associated with the user 128(2).

In some implementations, the user interface may allow the user 128 to select other pickup options, such as immediately (or within a short time span, such as 15 minutes), as soon as available, or after a particular time. For example, the user interface may present available times after which the user 128 may pick up their order, such as on or after 13:00, 14:00, 15:00, and so forth. As described above, this time may be based on information such as available pickup timeslot data 202, historical data 204 such as duration of pickup(s) 204(2), estimated workload at the facility 102, and so forth. The user 128 may then select a desired time, such as 14:00, to pick up their order. In another example, the user interface may present a prompt to the user 128 to "checkout now and get your order anytime today after 13:09".

Figure 6:
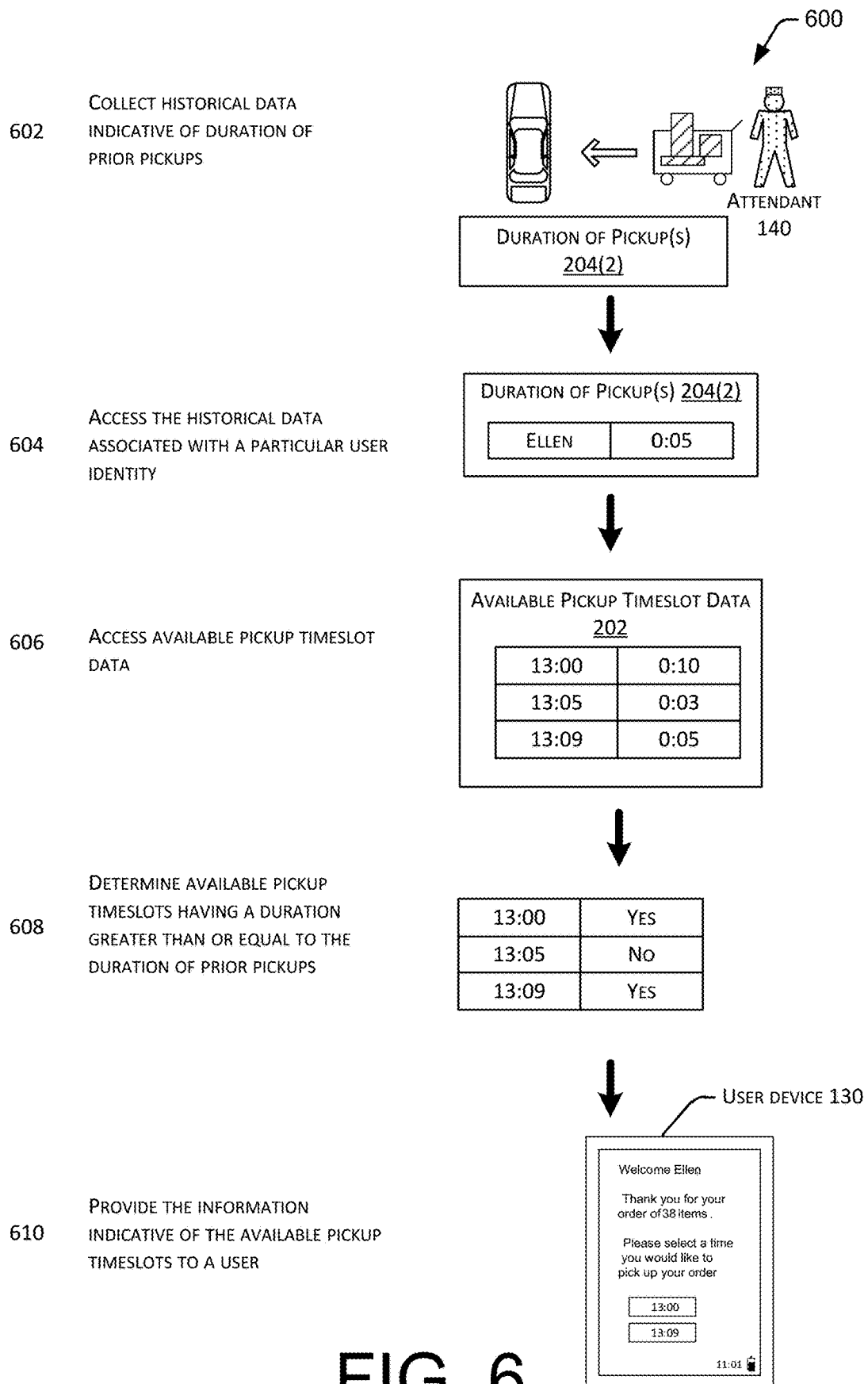
FIG. 6 illustrates a scenario in which the available pickup timeslots are presented based at least in part on the duration of prior pickups by a user.

FIG. 6 illustrates a scenario 600 in which the available pickup timeslot data 202 is presented based at least in part on the duration of previous pickups by a user 128 or vehicle 108. As described above, the available pickup timeslot data 202 presented to the user 128 may be based on data including, but not limited to, the order data 122, current status of the facility 102, historical data 204, and so forth. At 602, historical data 204 indicative of the duration of prior pickups is collected. For example, each time the user 128 stops at the facility 102, the inventory management system 116 may determine a length of time that elapses between when the attendant 140 arrives at the parking space 106 and the departure of the vehicle 108 from the parking space 106.

At 604, the inventory management system 116 may access the historical data 204 associated with a particular user identifier 222. For example, based on the geolocation data 138 that may include the user identifier 222 or other information that is associated with the user identifier 222, the inventory management system 116 may retrieve the maximum duration 506 for that user 128.

At 606, the inventory management system 116 may access available pickup timeslot data 202. At 608, available pickup timeslots having a duration greater than or equal to the duration of the prior pickups are determined. For example, the scheduling module 426 may apply a filter to the available pickup timeslot data 202 such that available pickup timeslots having a timeslot duration 504 that is less than the maximum duration 506 may be omitted.

At 610, information indicative of the available pickup timeslots is provided to the user 128. For example, the user device 130 may present the available pickup timeslots for the user 128 to select. The user input 512 may be received from the user device 130, and the pickup schedule data 206 may be generated therefrom.

Figure 7:
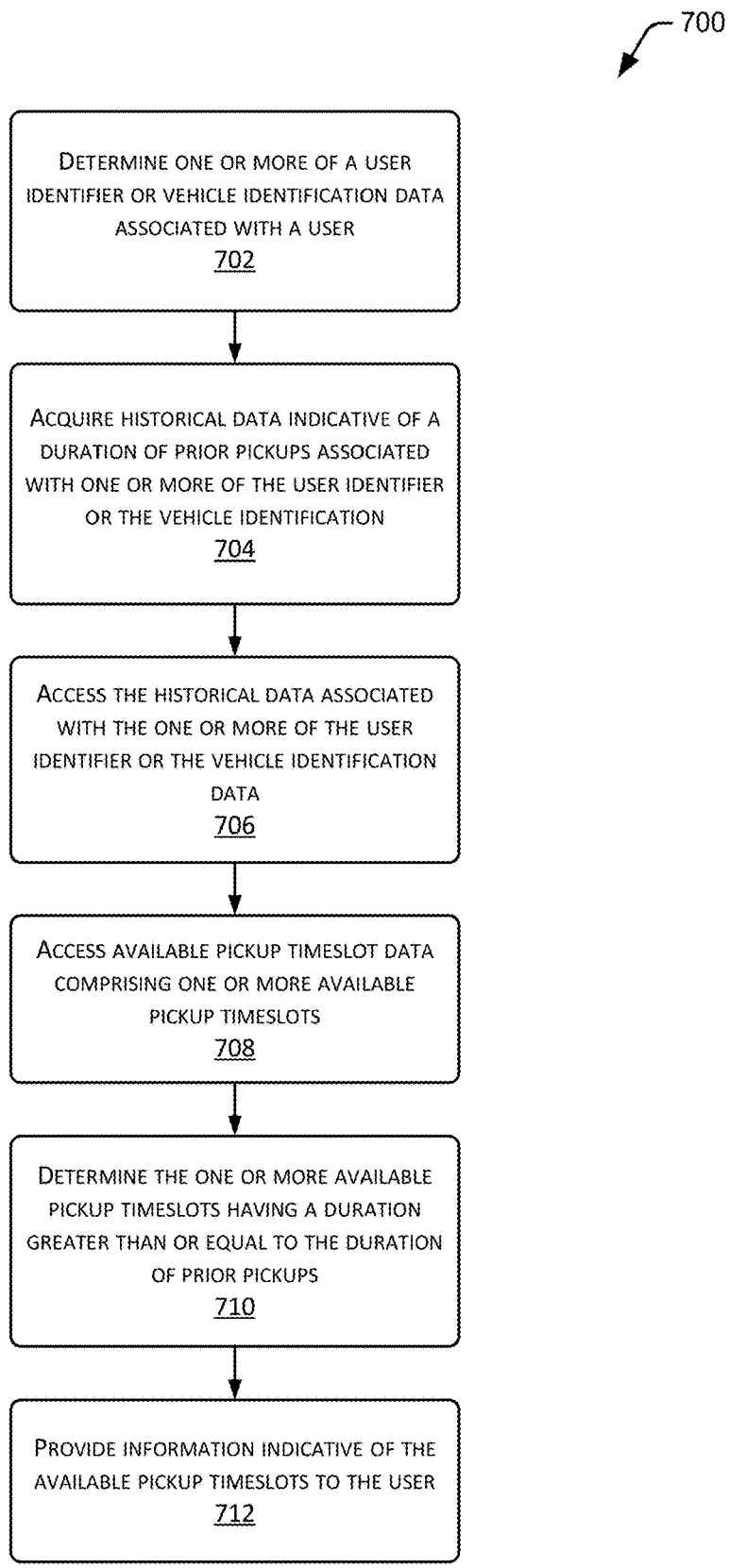
FIG. 7 illustrates a flow diagram of a process of providing available pickup timeslots to a user.

FIG. 7 illustrates a flow diagram 700 of a process of providing available pickup timeslots to a user 128. In some implementations, the process may be executed at least in part by the inventory management module 420.

Block 702 determines one or more of the user identifier 222 or vehicle identification data 218 associated with the user 128. For example, based on one or more of the sensor data 120, ETA data 212, TOE data 214, or validation data 226, the association data 220 may be generated that associates particular vehicle identification data 218 with a particular user identifier 222.

Block 704 acquires historical data 204 indicative of prior duration of pickups 204(2) associated with the user identifier 222 or the vehicle identification data 218.

Block 706 accesses the historical data 204 associated with the one or more of the user identifier 222 or the vehicle identification data 218. For example, where the sensor data 120 comprises image data 120(1) and has been processed to determine a license plate number, the prior duration of pickups 204(2) associated with the determined license plate number may be retrieved.

Block 708 accesses available pickup timeslot data 202. The available pickup timeslot data 202, as described above, may comprise one or more available pickup timeslots at which the items 112 may be transferred from the facility 102 to the user 128.

Block 710 determines the one or more available pickup timeslots having a duration greater than or equal to the duration of prior pickups by the user 128. Block 712 provides information indicative of the available pickup timeslots to the user 128. For example, the user interface module 432 may generate user interface data to provide the user interface depicted above with regard to FIG. 5 to the user device 130.

FIG. 8 illustrates a scenario 800 in which the identity of a user 128 is determined based on an estimated time of arrival and an actual time of arrival at the pickup facility 102.

At 802, geofence data 134 comprising one or more geographic boundaries 136 may be determined. In some implementations, the geographic boundaries 136 may be relative to the facility 102. For example, the geographic boundaries 136 may specify a distance of 5 miles by road from the facility 102. In another example, the geographic boundaries 136 may specify a travel time to the facility 102. The geofence data 134 may be determined based on one or more of a time of day; traffic conditions; weather conditions; form of transportation such as driving, walking, cycling, public transportation, and so forth; desired length of advance warning before the user 128 arrives at the facility 102; and so forth.

At 804, the geofence data 134 is provided to one or more devices. For example, the geofence data 134 may be distributed to a computer system onboard the vehicle 108, the client application 132 executing on the user device 130, and so forth. In some implementations, the distribution of the geofence data 134 may be omitted, such as where the devices described below provide ongoing geolocation data 138.

At 806, the geolocation data 138 from the one or more devices is accessed. For example, the client application 132 executing on the user device 130 may determine that the user device 130 has crossed the geographic boundary 136. Responsive to this crossing, the client application 132 may send geolocation data 138 indicative of the crossing to the map module 424. In another example, the geolocation data 138 may comprise information such as license plate data obtained from license plate readers on a toll road that is a known geolocation.

At 808, ETA data 212 may be generated based at least in part on the geolocation data 138. For example, the map module 424 may use the latitude, longitude, and time included in the geolocation data 138 received from the client application 132 in combination with information such as mapping data indicative of the physical dimensions and layout of city streets and current traffic conditions to determine when the user device 130 is expected to reach the facility 102.

In other implementations, such as when the geolocation data 138 is unavailable or unreliable, the ETA data 212 may be based on one or more of user input, historical data 204 of previous pickups, and so forth. For example, the ETA data 212 may be based on user input such as selection or entry of a particular pickup timeslot as stored in the pickup schedule data 206. In another example, the ETA data 212 may be based on historical data 204. Continuing the example, the user 128 may have a history of stopping by the facility 102 to pick up their order between 17:25 and 17:45. The ETA data 212 may thus be based on this previous behavior.

At 810, TOE data 214 of one or more of the vehicle 108, user 128, user device 130, or another object associated with the user 128 may be determined. For example, the TOE data 214 may be determined by processing the image data 120(1) of the camera 118(1) acquiring images of the vehicles 108 as they enter the parking area 104. The image data 120(1) may be processed to read the vehicle identification data 218 such as a license plate number. The time of the TOE data 214 may be determined based on the timestamp data associated with the image data 120(1). For example, image data 120(1) may include metadata indicative of a time at which the image data 120(1) was acquired by the camera 118(1).

At 812, based at least in part on the ETA data 212 and the TOE data 214, a user identifier 222 of the user 128 at the facility 102 may be determined. For example, where the ETA data 212 of the user 128(1) is expected to be 13:00:00 (hours:minutes:seconds), the TOE data 214 is 13:00:27, and an ETA threshold time 216 is 30 seconds, the inventory management module 420 may determine that the user 128(1) has arrived. As described below with regard to FIG. 9, in some implementations, the user identifier 222 may be confirmed, and the vehicle identification data 218 may be persistently associated with that user identifier 222.

FIG. 9 illustrates a scenario 900 in which at least a portion of items 112 of an order in the staging area 114 are transferred to the user 128 at the facility 102. At 902, the inventory management module 420 determines a parking space 106 associated with a user 128 and a staged order 126. In one implementation, the image processing module 428 may use image data 120(1) to determine which parking space 106 the vehicle 108 associated with the user identifier 222 has occupied. For example, the camera 118(1) may acquire an image of the vehicle 108 in a particular parking space 106. In another implementation, the parking prediction module 430 may estimate or determine a likely parking space 106 which the user 128 may use to park their vehicle 108.

At 904, dispatch data 224 is generated. For example, the inventory management module 420 may generate dispatch data 224 indicating which staging locations 124 within the staging area 114 to acquire the items 112 of the staged order 126 from. The dispatch data 224 may also indicate the parking space 106 that these items 112 are to be delivered to.

At 906, the attendant 140 may retrieve the one or more items 112 of the staged order 126 and convey the one or more items 112 to the parking space 106. For example, the attendant 140 may load the items 112 of the staged order 126 onto a tote 144.

At 908, the identity of the user 128 in the parking space 106 may be confirmed, and validation data 226 may be generated. Unlike traditional systems, the user 128 may not be required to complete a lengthy or involved check-in process to receive their order.

In one implementation, the identity of the user 128 may be confirmed by the attendant 140 querying the user 128. For example, the dispatch data 224 may indicate the name of the user 128, and the attendant 140 may ask the person in the vehicle 108 for their name. When the name given by the person matches the name indicated on the dispatch data 224, the attendant 140 may enter this information to generate the validation data 226.

In another implementation, the vehicle identification data 218 and the association data 220 may be used to generate validation data 226. For example, a previous association of a particular license plate number with a particular user identifier 222 may be deemed to be sufficient to validate such that any person within the vehicle 108 may pick up the order made by the account associated with the user identifier 222. Continuing the example, a teenage child driving their parents' vehicle 108 may be validated and permitted to pick up the order on behalf of their parents.

In yet another implementation, the identity of the user 128 may be confirmed automatically. For example, image data 120(1) of the face of the person in the vehicle 108 may be obtained while the vehicle 108 is traveling to the parking space 106 or stopped at the parking space 106. The image processing module 428 may use one or more facial recognition techniques and previously stored data to determine the identity of the user 128.

The system described in this disclosure allows the operator the facility 102 to avoid having the user 128 provide explicit credentials such as a membership card, payment information, vehicle operator's license, and so forth, at each interaction with the facility 102. As a result, during most interactions with the facility 102, the user 128 may simply drive into the facility 102, receive the items 112 in their order, and be on their way. The user 128 may not be required to provide payment information such as cash, check, credit card, stored value card, and so forth. In some implementations, while at the facility 102 the user 128 may tender payment to their account, such as providing cash to establish a credit on their account for future use.

In certain circumstances, the user 128 may be asked to provide one or more additional factors to authenticate their identity. These additional factors may include presentation of physical credentials or tokens, providing information such as username and password, and so forth. For example, where the appearance of the user 128 has changed sufficiently that facial recognition techniques are unable to determine the identity of the user 128, the person in the vehicle 108 may be asked for additional information such as to enter a password or fingerprint. In another example, particular types of orders may require additional confirmation. For example, orders containing age restricted materials such as tobacco or alcohol may require presentation of a government identification card such as a driver's license. In another example, orders containing user restricted tutorials such as pharmaceuticals may also require confirmation of identity of the user 128 using one or more other factors. In still another example, orders exceeding a particular dollar value may require additional confirmation.

At 910, the one or more items 112 of the order may be physically transferred to the vehicle 108 of the user 128. For example, the attendant 140 may load the items 112 into the vehicle 108. As described below in more detail, in some implementations, the user 128 may return items 112, exchange items 112, reject particular items 112 in their order, or add new items 112 while in the parking space 106. For example, the user 128 may not be satisfied with the quality of a bunch of bananas in their order and may ask for a replacement bunch of bananas. A rush pick order may be generated, and a replacement bunch of bananas may be swiftly dispatched to the parking space 106. In another example, an item 112 may be missing from the order and a rush pick order may be generated.

At 912, the user 128 may depart the parking space 106. Another vehicle 108 occupied by another user 128 may then move into the now vacant parking space 106 to receive their order.

Figure 10:
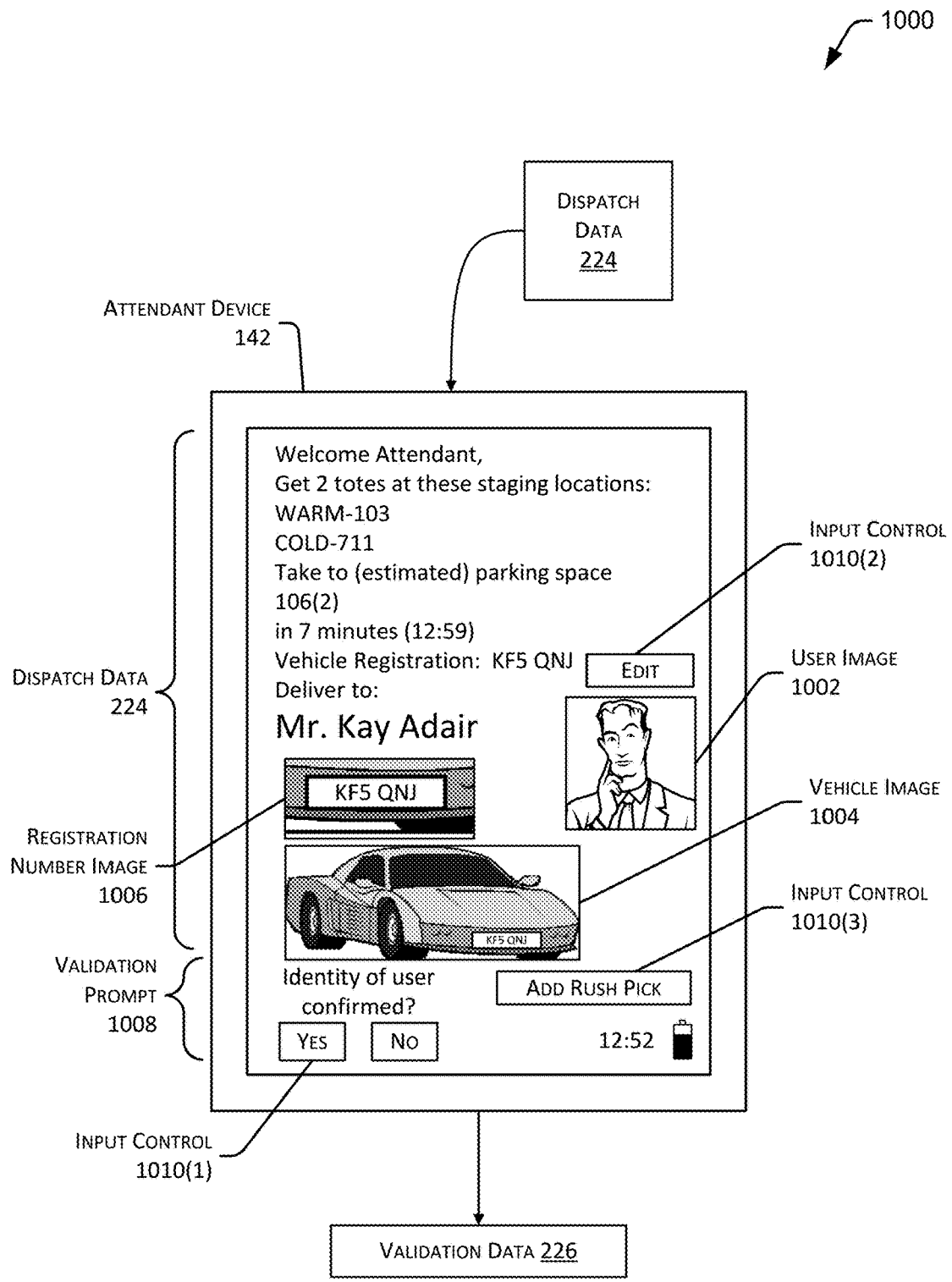
FIG. 10 illustrates an attendant device and a user interface used to dispatch the attendant and confirm the determined identity of the user.

FIG. 10 illustrates an attendant device 142 and a user interface 1000 used to dispatch the attendant 140 and confirm the determined identity of the user 128. The user interface 1000 may be presented to the attendant 140 before arrival of the user 128, while the user 128 is at the facility 102, or both. In this illustration, the dispatch data 224, ETA data 212, user data 232, and so forth have been provided to the attendant device 142. The information is presented using one or more output devices 302. For example, as depicted in FIG. 10, the display output device 302(3) presents an image with this information.

To facilitate the functions of the attendant 140, the user interface 1000 may include the staging data 210, indicating from which staging locations 124 in the staging area 114 portions of the staged order 126 are to be retrieved from, number of totes 144 or other containers to be retrieved, and so forth. As described above, in some implementations, the parking prediction module 430 may be used to determine a likely or probable set of one or more parking spaces 106 that the user 128 may utilize upon their arrival at the facility 102. The dispatch data 224 may indicate the predicted parking space 106 as well as a time at which the user 128 is expected to be at that parking space 106.

To assist the attendant 140 in interacting with the user 128, information about the user 128 may be presented in the user interface 1000. For example, one or more of the following information may be presented in the user interface 1000: the name of the user 128, a user image 1002 that depicts the face of the user 128, a vehicle image 1004 associated with the user 128, a registration number image 1006, an estimated or actual time of arrival, and so forth. Continuing the example, the user image 1002 may have been previously acquired, such as during registration of the user 128 while the vehicle image 1004 may be acquired during at least one of an approach or entry of the vehicle 108 to the facility 102. In some implementations, a subset of the information may be presented. For example, the first name or the last name of the user 128 may be presented in the user interface 1000.

The registration number image 1006 may comprise an image of the license plate of the vehicle 108 acquired while the vehicle 108 is on approach to or at the facility 102 for the current pickup. The information provided to the attendant device 142 may improve the ability of the attendant 140 to provide a personalized experience to the user 128.

The information provided may also be used to generate validation data 226. For example, a validation prompt 1008 may ask the attendant 140 to confirm the identity of the user 128 based on the information presented in the user interface 1000. For example, the attendant 140 may use the registration number image 1006 to disambiguate a vehicle 108 from other similar vehicles 108 in the parking area 104. Once disambiguated, the attendant 140 may approach the person in the vehicle 108 and ask them for their name. If the person responds with the name indicated on the attendant device 142 and they resemble the person depicted in the user image 1002, the attendant 140 may select a validation prompt 1008 control indicating that the identity is confirmed. The attendant device 142 may then generate the validation data 226 and provide this information to the inventory management module 420.

The validation prompt 1008 may comprise one or more input controls 1010. The input control 1010 is configured to accept input from the attendant 140. The input control 1010 may include one or more of a text field, a button, a checkbox, a radio button, a toggle button, a spinner, a list box, a combo box, a slider, and so forth. The input may be received using one or more of the sensors 118, such as the camera 118(1), button 118(3), touch sensor 118(4), microphone 118(5), accelerometer 118(10), and so forth. For example, the attendant 140 may speak input that is detected by the microphone 118(5) and processed as input. Or a gesture or movement of the attendant device 142 as detected by the accelerometer 118(10) may be used as input.

The information presented in the attendant device 142 to aid in the confirmation of the identity of the user 128 may be obtained in various ways. For example, the user image 1002, the vehicle image 1004, or both the user image 1002 and vehicle image 1004 may be obtained during a registration process to use the service provided by the facility 102. In another example, these images may be obtained during a first or prior use of the facility 102. Continuing the example, the first time the user 128 avails themselves of the services at the facility 102, the attendant 140 or one or more of the sensors 118 adjacent to the parking space 106 may obtain the user image 1002. The vehicle image 1004 may be an image of the actual vehicle 108 used by the user 128, or the vehicle image 1004 may be a picture or representation of the make and model of the vehicle 108 such as obtained from a data store. For example, the vehicle image 1004 may have been obtained from one or more cameras 118(1) during a previous visit to the facility 102, or the vehicle image 1004 may be a stock image as provided by a third party such as a vehicle manufacturer.

In some implementations, the validation prompt 1008 may be omitted and the inventory management module 420 may determine that the identity of the user 128 has been confirmed or rejected based at least in part on the actions or activities of the attendant 140. For example, the attendant 140 may recognize the user 128 by sight and may begin loading the order immediately. The sensors 118 may detect this activity, and the inventory management module 420 may thus designate the identity of the user 128 as being confirmed.

The information presented in the user interface 1000 may assist the attendant 140 in quickly locating the vehicle 108 in the parking area 104. For example, where the parking prediction module 430 is used to dispatch the attendant 140, there may be some variability between the predicted parking space 106 and the actual parking space 106 used by the user 128. Additional information such as the vehicle image 1004 may be used to facilitate a quick identification and determination by the attendant 140 of the parking space 106 actually used by the user 128. In some implementations, a map or other data such as directions indicative of a position of the parking space 106 in the parking area 104 may be presented.

In some situations, data presented to the attendant 140 may be incorrect, or may have changed. For example, the vehicle 108 may have new license plates, and the attendant 140 may wish to update the vehicle identification data 218. An input control 1010(2) may be configured to allow for additions, edits, deletion, or other changes to information associated with one or more of the user 128, the order, or both. Continuing the example, the attendant 140 may use the input control 1010(2) to change the vehicle identification data 218 by replacing the old license plate number with the new license plate number. In another implementation, the input control 1010(2) may be used to edit erroneous automated results. For example, the attendant 140 may correct a license plate number that is improperly recognized by the image processing module 428. In yet another example, the attendant 140 may add additional information such as a preferred nickname of the user 128.

In some situations the attendant 140 may need to initiate a rush pick, such as for an order of an impulse buy, to replace an item 112 rejected by the user 128, and so forth. The rush pick may be prioritized such that the pick and delivery to the parking space 106 is expedited. The attendant 140 may use an input control 1010(3) to provide input placing a rush pick order, alerting rush pick staff to stand by for a potential rush pick, and so forth. For example, the input provided by the input control 1010(3) may be sent to the inventory management system 116, which may then allocate a picker in the storage area 110 to stand by for an impending order. In some implementations, the input control 1010(3) may be a toggle button, such that deselecting may rescind the rush pick order or standby condition, releasing the previously dedicated picker for other duties.

One or more of the dispatch data 224 or the input controls 1010 may be updated while the attendant device 142 is in use. For example, the predicted parking space 106 information may be updated to indicate the actual parking space 106 after the user 128 stops their vehicle 108 in a parking space 106.

The attendant device 142 may include sensors 118 such as a camera 118(1). The camera 118(1) may be used to provide image data 120(1) such as a picture of the face of the user 128, of the vehicle 108, of the items 112 before, during, or after loading onto the vehicle 108, and so forth.

Figure 11:
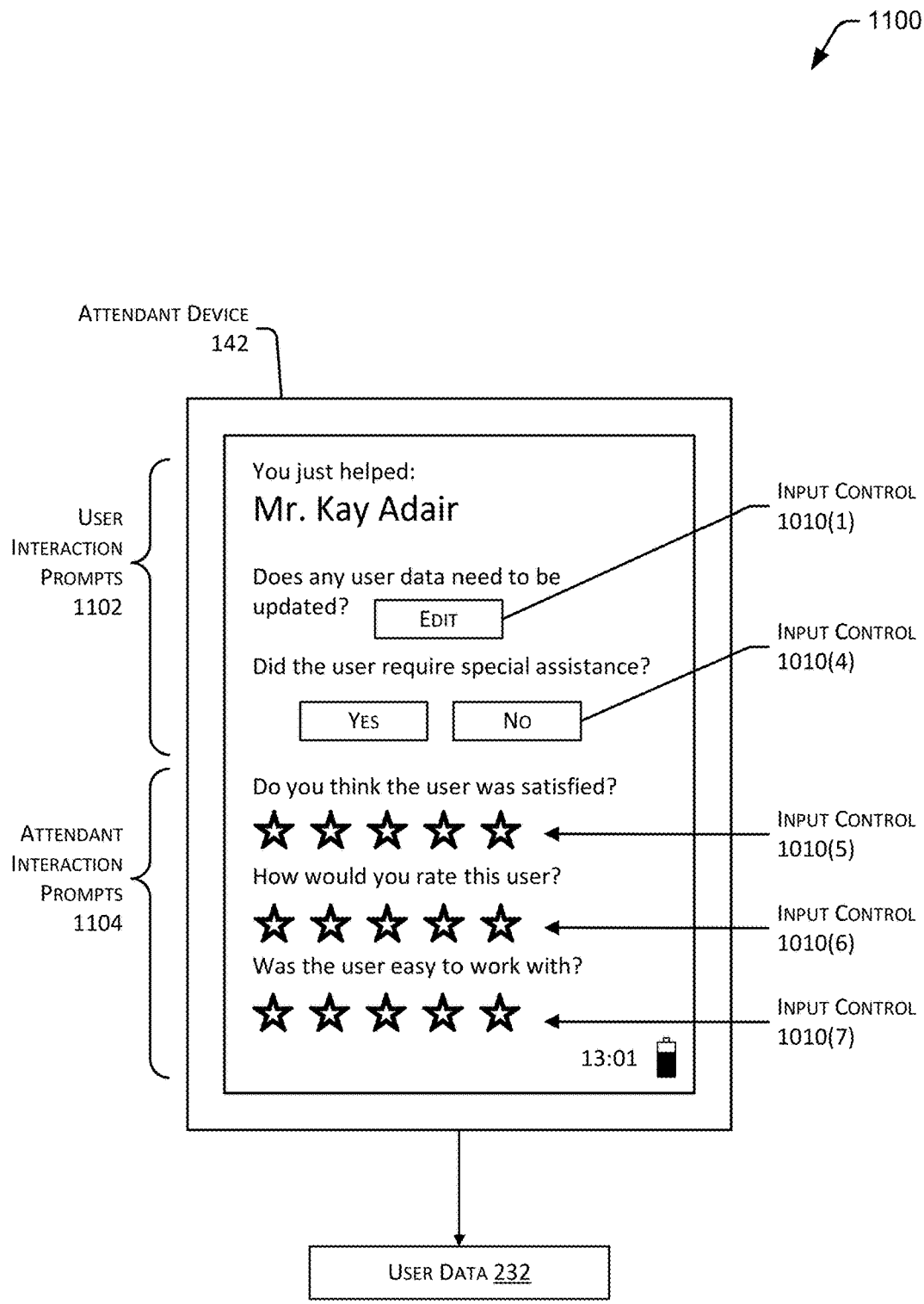
FIG. 11 illustrates an attendant device and a user interface used after the attendant has interacted with the user.

FIG. 11 illustrates an attendant device 142 and a user interface 1100 that may be used by the attendant 140 during or after an interaction with the user 128. The user interface 1100 may be presented using one or more output devices 302. This user interface 1100 may be presented while the user 128 is at the facility 102, after departure of the user 128 from the facility 102, or both.

Depicted in the attendant device 142 are several user interaction prompts 1102 that include one or more input controls 1010. The user interaction prompts 1102 may be used to provide information about the user 128 that may need to be updated or changed.

Input made to the input controls 1010 of the user interaction prompts 1102 may be used to generate or modify user data 232. For example, the user interaction prompts 1102 may provide input controls 1010(1) to allow the attendant 140 to update user data 232 such as a name, address, demographics, and so forth. The user interaction prompts 1102 may also provide input controls 1010(4) to allow the attendant 140 to indicate whether the user 128 required special assistance. Special assistance may include use of assistive devices, techniques, and so forth. For example, the attendant 140 may use this prompt to enter information such as the user 128 is hearing-impaired and requires auditory accommodation such as written prompts, sign language, and so forth.

Also depicted in the user interface 1100 are several attendant interaction prompts 1104 that include input controls 1010. Input made to the input controls 1010 of the attendant interaction prompts 1104 may be used to generate or modify user data 232. As described above, the user data 232 may comprise information about previous interactions between the user 128 and the facility 102, an entity operating the facility 102, attendants 140, third parties, and so forth. The attendant interaction prompts 1104 provide the attendant 140 with the ability to provide information such as the level of satisfaction the attendant 140 believes the user 128 experienced, a rating by the attendant 140 of the user 128, a rating by the attendant 140 as to whether the user 128 was amenable to work with, and so forth. For example, the attendant 140 may use the input control 1010(5) to rate the user 128 as appearing to be very satisfied with the interaction occurring during the pickup at the facility 102. This is the attendant's 140 impression of the user's 128 satisfaction.

The attendant 140 may further use the input control 1010(6) to provide an overall rating of the user 128, or input control 1010(7) to rate how easy the attendant 140 found the user 128 to work with.

The inventory management module 420 may use the user data 232 to adjust operation of the facility 102. For example, when the user interaction prompt 1102 provides information indicating that the user 128 required special assistance, at the next visit to the facility 102, suitable accommodations may be available to improve the experience of the user 128. In another example, when the attendant interaction prompt 1104 provides information indicating that the user 128 was difficult to work with, more time may be allocated for a future pickup by the user 128, a particular attendant 140 may be tasked to handle the next pickup, and so forth.

Other information that may be acquired may include, but is not limited to, user satisfaction, rating of the user 128 by the attendant 140, ease with which the attendant 140 was able to work with the user 128, and so forth.

While FIGS. 10 and 11 depict graphical interfaces presented on a display output device 302(3), in other implementations the user interfaces presented to the attendant 140 may be presented using the haptic output devices 302(1), the audio output devices 302(2), and so forth. For example, audible prompts may be heard by the attendant 140, who may then provide input using speech detected by the microphone 118(5).

In some implementations, the information, prompts, input controls 1010, and so forth depicted in FIGS. 10 and 11 may be combined or otherwise arranged. For example, the user interface 1000 may include user interaction prompts 1102, while the user interface 1100 may include dispatch data 224 or a validation prompt 1008.

Figure 12:
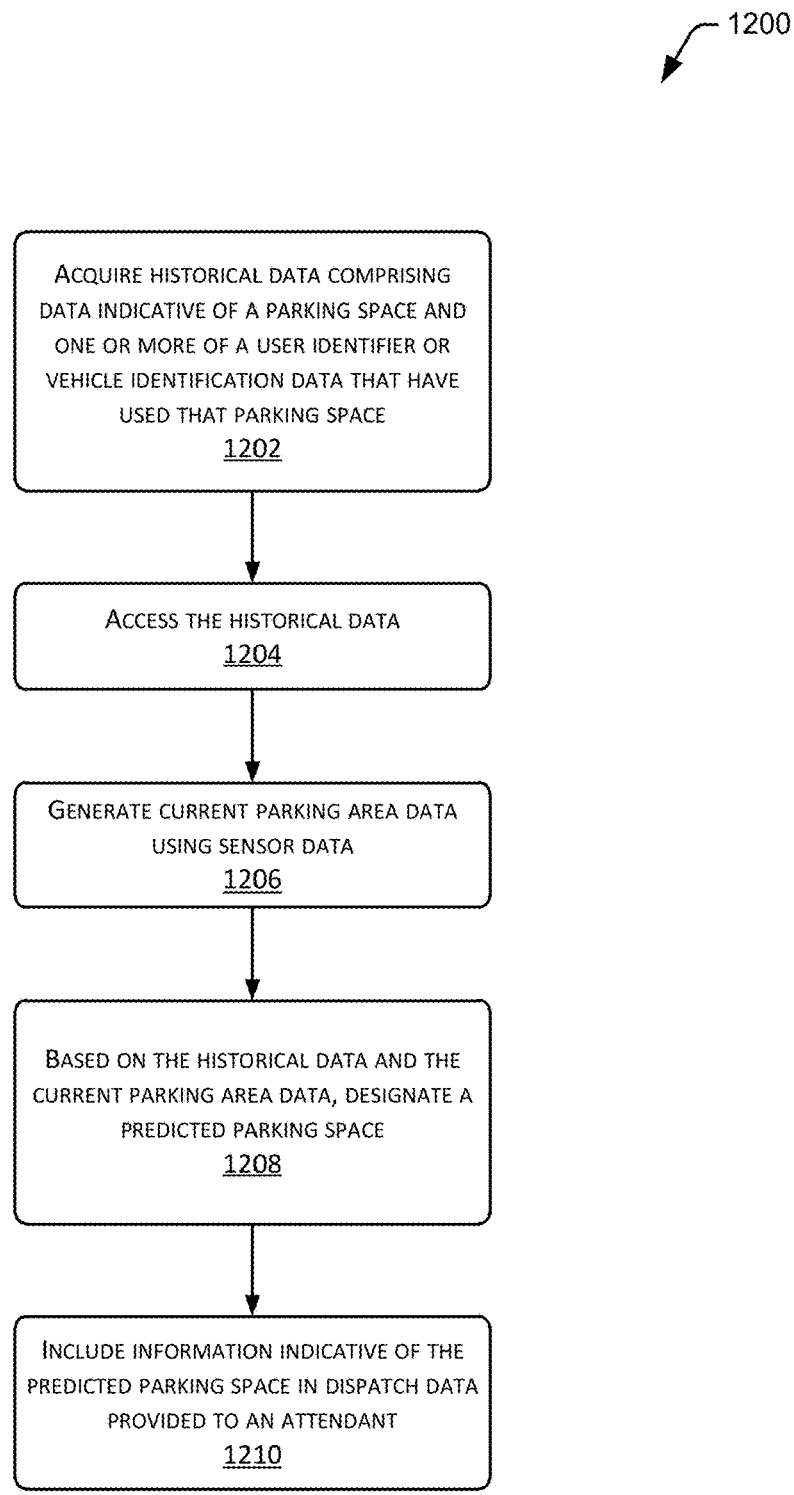
FIG. 12 illustrates a flow diagram of a process of estimating where a user will park at the pickup facility.

FIG. 12 illustrates a flow diagram 1200 of a process of estimating where a user 128 will park their vehicle 108 in the parking area 104. In some implementations, the process may be executed at least in part by the parking prediction module 430.

Block 1202 acquires historical data 204. The historical data 204 may be indicative of a parking space 106 and one or more of the user identifier 222 or vehicle identification data 218 that have been associated with or used by the parking space 106 during previous visits by the user 128. The visits may be to the same facility 102 or to another facility 102. For example, the parking spaces used 204(1) data may indicate that the user 128(1) has parked in parking spaces 7, 10, 5, and 8 during the last four visits. In another example, the parking spaces used 204(1) data may indicate that the vehicle 108(2) has parked in parking spaces 45, 39, 47, and 51 during the last four visits. The user 128 may park in different parking spaces 106 depending upon the vehicle 108 they are using, environmental factors, and so forth. For example, while the user 128(1) is driving a motorcycle on a hot day, they may be more likely to use a parking space 106 that is in the shade. The same user 128, when driving an automobile, may be more likely to use a parking space that is close to the exit of the facility 102. Where the historical data 204 is obtained from another facility 102, the data may be normalized or remapped such that comparisons between different physical layouts of different facilities 102 may be made.

Block 1204 accesses the historical data 204. For example, the parking prediction module 430 may access the parking spaces used 204(1) data, historical parking area data, and so forth.

Block 1206 generates current parking area data using the sensor data 120. The current parking area data may be indicative of one or more of the following: location of vehicles 108 in the parking area 104, movement of the vehicles 108 in the parking area 104, estimated load times associated with the vehicles 108 in the parking area 104, weather conditions at the parking area 104, and so forth. For example, the current parking area data may indicate the currently occupied parking spaces 106 and data about the orders being delivered to those parking spaces 106.

Based at least in part on the historical data 204 and the current parking area data, block 1208 designates a set of one or more parking spaces 106 the vehicle 108 is expected to use. For example, the parking prediction module 430 may use information about the parking spaces 106 currently occupied and the size of the orders associated with those spaces to determine which parking spaces 106 are likely to be unoccupied when the vehicle 108 arrives at the facility 102. Based on the historical data 204, the parking prediction module 430 may designate, from those parking spaces 106 likely to be unoccupied, a set of one or more parking spaces 106 the vehicle 108 is likely to park at.

Block 1210 includes the predicted parking space 106 in the dispatch data 224 provided to the attendant 140. For example, the predicted parking space 106 may be presented in the user interface 1000 of the attendant device 142. As described above, in some implementations, the user interface 1000 may be updated to include an actual parking space 106 after the vehicle 108 has come to rest at a parking space 106 selected by the user 128.

Figure 13:
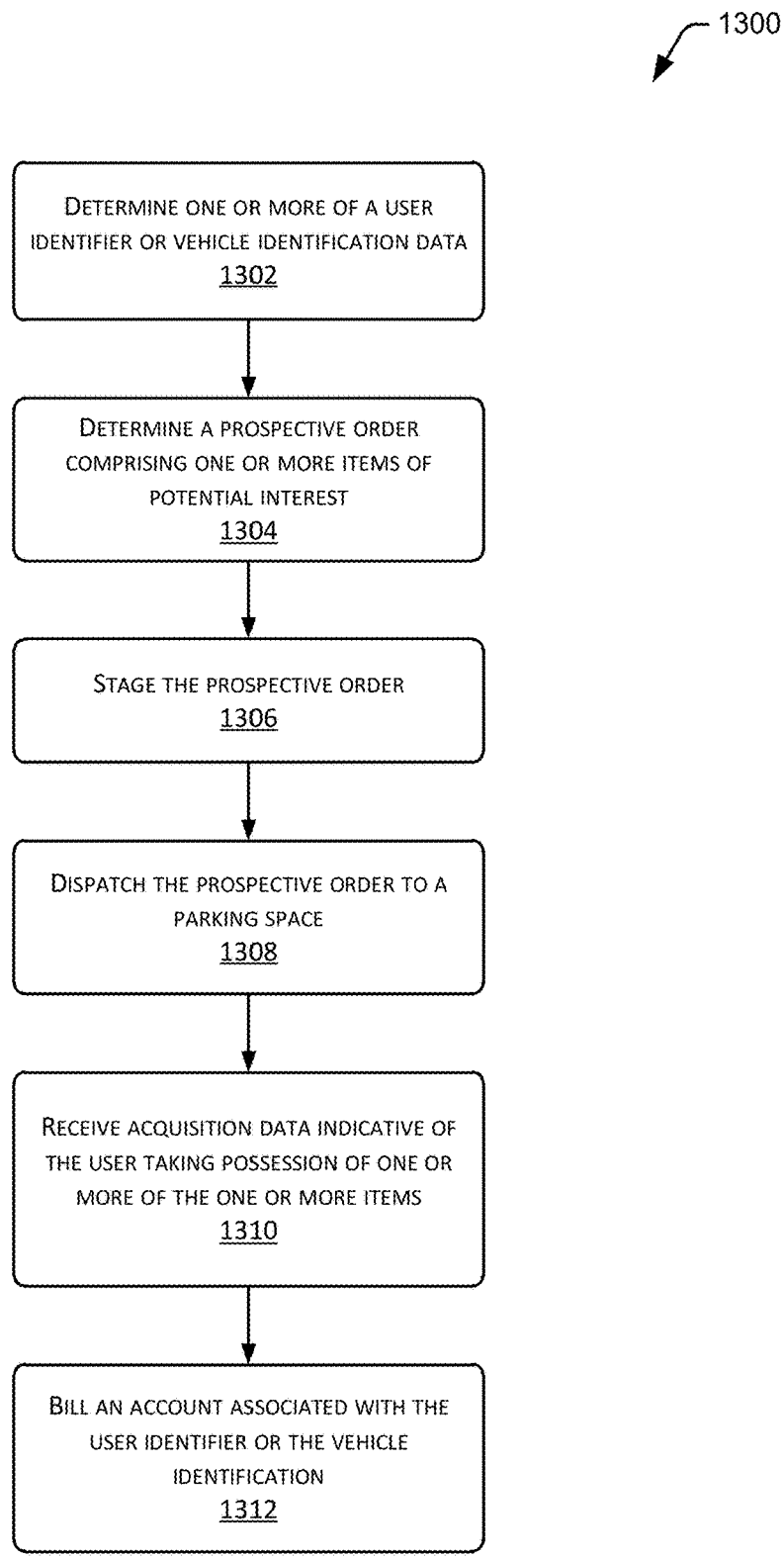
FIG. 13 illustrates a flow diagram of a process of providing a prospective order of recommended items to a user of the pickup facility.

FIG. 13 illustrates a flow diagram 1300 of a process of providing a prospective order of recommended items 112 to a user 128 of the facility 102. The process may be executed at least in part by the inventory management module 420. While at the facility 102, it may be desirable to provide the user 128 with additional items 112 that were not part of the order data 122 in order to improve the customer experience, increase sales, reduce the number of rush pick orders, and so forth.

Block 1302 determines one or more of the user identifier 222 or vehicle identification data 218. For example, the user identifier 222 may be determined from information present in the order data 122. In another example, the vehicle identification data 218, such as a license plate number, may be read by a sensor 118 while the vehicle 108 is in the parking area 104.

Block 1304 determines a prospective order comprising one or more items 112 of potential interest to the user 128 or to the occupants of the vehicle 108. In some implementations, the prospective order may be based at least in part on the identity of the user 128. For example, the prospective order may comprise one or more items 112 recommended to the user 128 based at least in part on previous purchases associated with the user identifier 222. In some implementations, the prospective order may be based on one or more items 112 that may be of potential interest to a group of users 128 rather than a specific user 128. For example, the prospective order may comprise items 112 that are popular for purchase in a given geographic area. In another example, the prospective order may comprise items 112 that are being offered promotionally.

Block 1306 stages, at the one or more staging locations 124 in the staging area 114, the prospective order. In some implementations, a plurality of duplicate prospective orders may be staged within the staging area 114. For example, where the prospective order comprises items 112 that are being offered promotionally, a plurality of these prospective orders may be staged in the staging area 114.

Block 1308 dispatches the prospective order to the parking space 106. For example, the attendant 140 may be instructed to retrieve the staged order 126 as well as the prospective order.

Block 1310 receives actual delivery data 228 indicative of the user 128 taking possession of one or more of the one or more items 112 of potential interest. For example, the sensor data 120 may comprise image data 120(1) showing the user 128 accepting one or more items 112 from the prospective order. In another implementation, the attendant 140 may use the attendant device 142 to scan or otherwise input the acceptance of the one or more items 112 from the prospective order by the user 128.

Based on the actual delivery data 228, block 1312, generates billing data 230 for an account associated with the user identifier 222 or the vehicle identification data 218. For example, the actual delivery data 228 may indicate that the user 128 has taken possession of a beverage from the dispatched prospective order. The billing data 230 may add the cost of the beverage to the account associated with the user identifier 222.

In some implementations, the process described may be modified for situations such as based on the number of different users 128 present within the same vehicle 108. For example, the vehicle 108 may comprise a bus with multiple users 128 onboard, and the billing data 230 may be associated with a particular account associated with the vehicle 108, such as the account of an operator of the bus.

Figure 14:
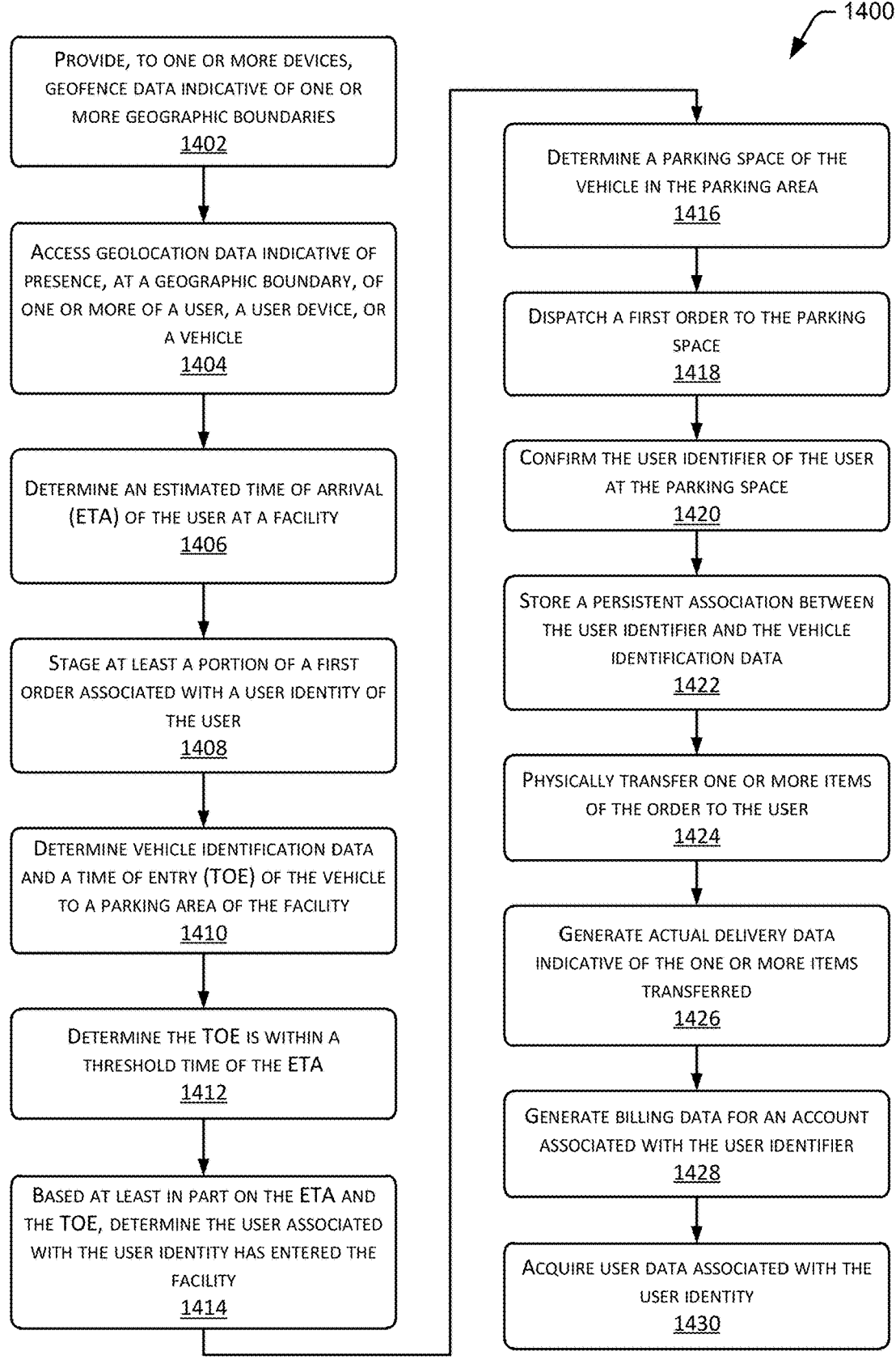
FIG. 14 illustrates a flow diagram of a process of using geolocation data to determine an estimated time of arrival (ETA) of a user at a pickup facility, identify the user based at least in part on the ETA, and transfer one or more items to the user.

FIG. 14 illustrates a flow diagram 1400 of a process of using geolocation data 138 to determine ETA data 212 of a user 128 at a facility 102, identify the user 128 based at least in part on the ETA data 212, and transfer one or more items 112 to the user 128.

Block 1402 provides geofence data 134 to one or more devices. As described above, the geofence data 134 may comprise data indicative of one or more geographic boundaries 136. The one or more devices may include, but are not limited to, one or more of an onboard computer system of the vehicle 108, a geolocation system such as maintained by a cellular communication system, user device 130, traffic monitoring system, and so forth. In some implementations, the geofence data 134 may be provided to the user device 130 via the network 146.

Block 1404 accesses geolocation data 138. For example, the geolocation data 138 may be received from the client application 132 of the user device 130. As described above, the geolocation data 138 may comprise data indicative of one or more of the user 128, the user device 130, the vehicle 108, and so forth, present at or crossing the geographic boundary 136.

Block 1406 determines an ETA of the user 128, the user device 130, the vehicle 108, and so forth, at the facility 102. For example, the map module 424 may use the geolocation data 138 and the current traffic data to determine the ETA. In another example, the ETA may be based on user input, such as the user 128 providing data indicative of when they will pick up their order. In another example, the ETA may be determined based on both the geolocation data 138 and the user input.

Block 1408 stages an order associated with the user identifier 222 or vehicle 108 for delivery at one or more staging locations 124 in the staging area 114. As described above, the order may comprise one or more items 112 included in the order data 122. In some situations, due to stockouts, the order may be incomplete relative to the order data 122.

Block 1410 determines vehicle identification data 218 and TOE data 214 of the vehicle 108. For example, the determination may comprise acquiring image data 120(1) comprising a vehicle image 1004 of at least a portion of a vehicle 108 upon at least one of an approach or entry by the vehicle 108 to a parking area 104 of the facility 102. The image data 120(1) may be processed using one or more of the techniques utilized by the image processing module 428 to read the license plate data or the vehicle identification data 218. For example, a portion of the image data 120(1) corresponding to a license plate may be determined, and one or more characters of the license plate may be recognized using optical character recognition. The one or more characters of the license plate may be stored as vehicle identification data 218. In some implementations, the reading of the license plate may be incomplete. For example, due to dirt one or more of the characters of the license plate may be unreadable or incorrectly read. In another example, the vehicle identification data 218 may be based upon receiving a signal such as from an RFID tag on the vehicle 108.

The image data 120(1) may also comprise a timestamp indicative of the time the image data 120(1) was acquired. The TOE data 214 may be based on the timestamp of when the image data 120(1) was acquired. In another implementation, the TOE data 214 may be determined based on the time the image data 120(1) was received by the data acquisition module 422.

Block 1412 determines the TOE data 214 is within an ETA threshold time 216 of the ETA data 212. For example, the ETA threshold time 216 may be 60 seconds, and the vehicle 108 may have entered the parking area 104 of the facility 102 within the 60 second ETA threshold time 216.

Based at least in part on the ETA data 212 and the TOE data 214, block 1414 determines the user 128 associated with the user identifier 222 has entered the facility 102. For example, if the user 128(1) has an ETA to the facility 102 of 13:00:00 (hours:minutes:seconds), an ETA threshold time 216 of 60 seconds, and the TOE data 214 of an otherwise unidentified vehicle 108 is 13:00:15, the inventory management module 420 may determine that the vehicle 108 that has entered the facility 102 is carrying the user 128 having the user identifier 222.

In some implementations, instead of or in addition to the use of the ETA data 212 and the TOE data 214, the user identifier 222 may be determined at least in part using the association data 220. For example, the vehicle identification data 218 may be acquired upon entry of the vehicle 108 to the facility 102. Based on the vehicle identification data 218, the user identity 222 may be retrieved.

Block 1416 may determine a parking space 106 of the vehicle 108 in the parking area 104, as described above. In some implementations, the determined parking space 106 may be an actual parking space 106, such as determined by one or more the sensors 118. In other implementations, the determined parking space 106 may be determined by the parking prediction module 430 in advance of the arrival of the vehicle 108, as described above.

Block 1418 dispatches a first order to the parking space 106. For example, the first order may be based at least in part on order data 122. Dispatch data 224 associated with the order data 122 may be sent to the attendant device 142. Responsive to the dispatch data 224, the attendant 140 may retrieve the staged order 126 from the one or more staging locations 124 and deliver the staged order 126 to the parking space 106.

In some implementations, the generation of dispatch data 224 may be responsive to the confirmation of the user identifier 222 and the identification of the actual parking space 106. For example, the image processing module 428 may be used to apply the facial recognition techniques to determine the identity of the user 128. In another implementation, as described above, a prospective order of items 112 that were not explicitly ordered by the user 128 may be dispatched to the parking space 106 as well.

The dispatch data 224 may include instructions or information about the staging locations 124 such that the attendant 140 or another operator may consolidate the one or more items 112 stored in the staging locations 124 for delivery within a threshold time interval of the ETA data 212. For example, the attendant 140 may be directed to complete the consolidation of the staged order 126 within two minutes of the estimated arrival of the user 128.

In some implementations, the vehicle identification data 218 may be incomplete or partially incorrect. A license plate number read from a license plate using image processing techniques may misread one or more characters due to dirt, glare, and so forth. For example, the first letter of the license plate may be unknown or incorrectly read. During subsequent visits to the facility 102, the vehicle identification data 218 acquired from the sensors 118 may be compared with that previously stored, such that a partial correspondence may result in an association between a user identifier 222 and the vehicle 108. For example, the license plate "KF5 QNJ" may be incorrectly read as "KFS ONJ". Based on the ETA data 212, the inventory management module 420 may retrieve the vehicle registration data 218(1) expected at the facility 102 within a window of time. A comparison for partial matches may be made. If a threshold number of characters match those in the previously stored vehicle registration data 218(1), the user identifier 222 may be associated. Continuing this example, the comparison results in data indicating that the incorrectly read "KFS ONJ" is associated with the user 128(1). Should the situation arise where there are multiple potential matches, such as three expected vehicles 108 with similar vehicle identification data 218(1), three attendants 140 may be dispatched to prepare and deliver three different orders. This may be done to reduce user 128 wait times.

Block 1420 confirms the user identifier 222 of the user 128 in the parking space 106. For example, as described above, the attendant 140 may ask the user 128 to state their name and may compare this information against the information provided by the dispatch data 224 to the attendant device 142. Based on the confirmation, the attendant 140 may generate validation data 226. In some implementations, the attendant 140 may perform other activities such as acquiring an image of the face of the user 128. The image of the face of the user 128 may then be associated with the user identifier 222. As described above in FIG. 10, on future visits to the facility 102, the user image 1002 may be presented to the attendant 140 to aid in identifying the user 128. The user image 1002 may also be used for facial recognition allowing for automated identification of the user 128 in future visits to the facility 102.

In other implementations, the validation data 226 may be generated automatically and without explicit input by the attendant 140. For example, the action of the attendant 140 placing the items 112 in the vehicle 108 may be recognized by the inventory management module 420 and deemed to be indicative that the user identifier 222 is correct.

Block 1422 may store a persistent association between the user identifier 222 and the vehicle identification data 218. For example, responsive to the validation data 226 indicating that the vehicle 108 is associated with the user identifier 222, the inventory management module 420 may generate association data 220 indicating the license plate number (or a portion thereof) of the vehicle 108 is associated with the user 128.

Block 1424 initiates physical transfer of one or more items 112 of the order to the user 128. For example, the attendant 140 may be instructed to load the items 112 into the vehicle 108.

In some implementations, the user 128 may choose to return an item 112, acquire an additional item 112, replace an item 112, and so forth. The inventory management module 420 may receive a supplemental order associated with the user identifier 222 while the user 128 is at the facility 102. For example, while parked in the parking space 106, the user 128 may decide to order 5 pounds of kale and bottled water. The inventory management module 420 may receive the supplemental order and may initiate a rush pick of the one or more additional items 112. For example, the rush pick may include using multiple pickers to simultaneously pick items 112 from different storage locations within the storage area 110 to gather the kale and the bottled water. A second attendant 140 or a picker may be dispatched to deliver the supplemental order to the user 128 in the parking space 106.

Block 1426 generates actual delivery data 228 indicative of the one or more items 112 that have been transferred to the user 128. For example, the actual delivery data 228 may be based at least in part on image data 120(1) and weight data comparing a weight of the vehicle 108 upon arrival with the weight of the vehicle 108 just prior to departure from the parking area 104. The weight data may be adjusted to include the weight of the items 112 that were added to the vehicle 108 prior to departure.

Block 1428 generates billing data 230 for an account associated with the user identifier 222. In some implementations, the billing data 230 may be associated with a group of users 128. In other implementations, the billing data 230 may be associated with an entity such as a business, a vehicle 108, and so forth. For example, the billing data 230 may be configured to apply charges to a rental company that owns the vehicle 108.

Block 1430 acquires user data 232 associated with the user identifier 222. For example, the user data 232 may comprise information indicating changes to the account of the user 128 as given to the attendant 140, attendant interaction data provided by the attendant 140 about the user 128, and so forth.

CONCLUSION

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited, to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   at least one communication interface;
   memory storing computer-executable instructions;
   at least one hardware processor in communication with the at least one communication interface and the memory, the at least one hardware processor configured to execute the computer-executable instructions to:
   receive geolocation data, acquired by a first device, the geolocation data is indicative of presence of a vehicle at a geographic boundary, wherein the vehicle is associated with a user identifier;
   determine an estimated time of arrival of the vehicle at a facility;
   access a first set of vehicle identification data that associates particular user identifiers with particular vehicle identification data;
   determine, based on the estimated time of arrival and a threshold period of time, a second set of vehicle identification data comprising a portion of the first set of vehicle identification data associated with user identifiers having estimated times of arrival that are within the threshold period of time of a particular time, wherein the second set of vehicle identification data is smaller than the first set of vehicle identification data;
based at least in part on the geolocation data, stage, at one or more staging locations, at least a portion of a first order associated with the user identifier, wherein the user identifier is associated with the vehicle for delivery;
receive at least a portion of the particular vehicle identification data acquired by a second device, wherein the at least a portion of the particular vehicle identification data is associated with one or more of an approach or entry of the vehicle to a parking area of the facility, and wherein the second device comprises one or more of:
a camera,
a radio frequency identification (RFID) reader, or
a weight sensor;
determine a correspondence between the at least a portion of the particular vehicle identification data and the second set of vehicle identification data;
based at least in part on the determined correspondence, determine the user identifier associated with the at least a portion of the particular vehicle identification data is present at the facility, wherein the user identifier is associated with the vehicle; and
dispatch the first order that comprises one or more items to the parking area.

2. The system of claim 1, wherein the first set of vehicle identification data and the second set of vehicle identification data comprises one or more of:
a license plate number,
data transmitted by a communication device,
a radio frequency identification tag,
an optical tag,
a type of the vehicle,
a make of the vehicle,
a model of the vehicle, or
a color of the vehicle.

3. The system of claim 1, further comprising computer-executable instructions to:
access pickup schedule data indicative of a time a user is scheduled to pickup the first order, wherein the computer-executable instructions to determine that the at least the portion of the particular vehicle identification data is present at the facility is further based at least in part on the pickup schedule data; and
store a persistent association between the user identifier and the particular vehicle identification data.

4. The system of claim 1, further comprising computer-executable instructions to:
access persistent association data, wherein the persistent association data associates the user identifier with the particular vehicle identification data; and
wherein the computer-executable instructions to determine the correspondence between the at least a portion of the particular vehicle identification data and the second set of vehicle identification data are further based at least in part on a correspondence between the persistent association data and the at least a portion of the particular vehicle identification data.

5. The system of claim 1, wherein the geolocation data comprises one or more of:
a time at which the first device associated with a user traversed the geographic boundary,
a geographic location of the first device associated with the user,
a destination geolocation in use by the first device,
a heading of the first device, or
a speed of the first device.

6. The system of claim 1, further comprising computer-executable instructions to:
access historical data indicative of duration of prior pickups associated with the user identifier associated with the vehicle;
access available pickup timeslot data comprising one or more available pickup timeslots;
determine the one or more available pickup timeslots having a duration greater than or equal to the duration of prior pickups; and
provide information indicative of the one or more available pickup timeslots.

7. The system of claim 1, further comprising computer-executable instructions to:
receive a second order associated with the user identifier associated with the vehicle, the second order comprises one or more additional items;
initiate a rush pickup of the one or more additional items; and
dispatch the second order to the parking area.

8. The system of claim 1, further comprising a plurality of sensors configured to generate sensor data; and further comprising computer-executable instructions to:
access historical data associated with the user identifier, wherein the historical data is indicative of where in one or more of the parking area or another parking area of another facility that an order has been dispatched to on previous visits;
generate current parking area data using the sensor data, wherein the current parking area data is indicative of one or more of:
location of vehicles in the parking area,
movement of the vehicles in the parking area,
estimated load times associated with the vehicles in the parking area, or
weather conditions at the parking area; and
based at least in part on the historical data and the current parking area data, designate a predicted parking space.

9. The system of claim 1, further comprising computer-executable instructions to:
based on the user identifier associated with the vehicle, determine a prospective order comprising one or more items of potential interest;
stage, at the one or more staging locations, the prospective order;
dispatch the prospective order to the parking area;
receive actual delivery data that is indicative of a transfer of possession of one or more of the one or more items of potential interest; and
based on the actual delivery data, generate billing data for an account associated with the user identifier, wherein the user identifier is associated with the vehicle.

10. The system of claim 1, wherein the geolocation data acquired by the first device further comprises the first device determining that the vehicle associated with the user identifier traversed the geographic boundary.

11. A method comprising:
determining an estimated time of arrival of a vehicle at a facility, wherein the vehicle is associated with a user identifier;
accessing a first set of user account data that associates particular user identifiers with particular user account data;

determining, based on the estimated time of arrival and a threshold period of time, a second set of user account data comprising at least a portion of the first set of user account data associated with one or more user identifiers that are expected to arrive at estimated times of arrival that are within the threshold period of time of a particular time, wherein the second set of user account data is smaller than the first set of user account data;

receiving at least a portion of the user identifier acquired by a second device, the at least the portion of the user identifier associated with a first device traversing a geographic boundary associated with one or more of an approach or entry of the vehicle to the facility, wherein the second device comprises one or more of:
a camera,
a radio frequency identification (RFID) reader, or
a weight sensor;

determining a correspondence between the at least a portion of the user identifier and the second set of user account data;

based at least in part on the determined correspondence, determining the user identifier associated with the particular user account data is present at the facility, wherein the user identifier is associated with the vehicle; and sending a notification indicative of a first order for delivery to the vehicle.

12. The method of claim 11, further comprising:
processing at least a portion of a plurality of images acquired at the facility to determine a parking space of the vehicle;
processing the at least a portion of the plurality of images to confirm the user identifier associated with the vehicle using facial recognition; and
wherein the sending the notification is responsive to a confirmation of the user identifier associated with the vehicle and includes information indicative of the parking space.

13. The method of claim 11, further comprising:
directing one or more items in the first order to be staged in one or more staging locations; and
based at least in part on the estimated time of arrival, consolidating one or more items of the first order for delivery within the threshold period of time of the estimated time of arrival.

14. The method of claim 11, further comprising:
determining user account data associated with the vehicle; and
storing a persistent association between the user identifier and the user account data, wherein the user identifier is associated with the vehicle.

15. The method of claim 11, further comprising:
accessing persistent association data, wherein the persistent association data associates a particular user identifier with user account data; and
wherein the determining the correspondence between the at least a portion of the user identifier associated with the vehicle and the second set of user account data is further based at least in part on a correspondence between the persistent association data and the particular user account data.

16. The method of claim 11, further comprising:
based on the user identifier associated with the vehicle, determining a prospective order comprising one or more items of potential interest;
staging, at one or more staging locations, the prospective order;
dispatching the prospective order; and
generating actual delivery data that is indicative of a transfer of possession of one or more of the one or more items of potential interest.

17. The method of claim 11, further comprising:
accessing historical data associated with the user identifier, wherein the historical data is indicative of where in one or more of a parking area or another parking area of another facility that an order has been dispatched to on previous visits;
accessing current parking area data, wherein the current parking area data is indicative of one or more of:
location of vehicles in the parking area,
movement of the vehicles in the parking area,
estimated load times associated with the vehicles in the parking area, or
weather conditions in the parking area;
based at least in part on the historical data and the current parking area data, designating a predicted parking space; and
dispatching one or more items associated with the first order to the predicted parking space.

18. A system comprising:
at least one communication interface;
memory storing computer-executable instructions;
at least one hardware processor in communication with the communication interface and the memory, the hardware processor configured to execute the computer-executable instructions to:
determine an estimated time of arrival of a vehicle at a facility, wherein the vehicle is associated with a user identifier;
access a first set of user account data that associates particular user identifiers with particular user account data;
determine, based on the estimated time of arrival and a threshold period of time, a second set of user account data comprising at least a portion of the first set of user account data associated with user identifiers that are expected to arrive at estimated times of arrival that are within the threshold period of time of a particular time, wherein the second set of user account data is smaller than the first set of user account data;
receive at least a portion of the user identifier acquired by a second device, the at least the portion of the user identifier associated with a first device traversing a geographic boundary associated with an approach or entry of the vehicle to the facility, wherein the second device comprises one or more of:
a camera,
a radio frequency identification (RFID) reader, or
a weight sensor;
determine a correspondence between the at least a portion of the user identifier and the second set of user account data;
determine, based on the determined correspondence, the user identifier associated with the vehicle is at a facility that is associated with user account data; and
send a notification that is associated with a first order for delivery.

19. The system of claim 18, further comprising computer-executable instructions to:
receive, from an attendant, validation data confirming a persistent association between the user identifier and stored identification data associated with a user;
acquire an image of a face of a user; and associate the image of the face of the user with the user identifier.

20. The system of claim 18, further comprising computer-executable instructions to:
provide, to an attendant, staging location data indicative of one or more staging locations at which the first order is staged; and
provide, to the attendant, one or more of:
an image of the vehicle associated with a user as acquired by at least one of a plurality of cameras,
a visual representation of the vehicle to the attendant, or
an image of a face of a user.

* * * * *